United States Patent [19]
Lynch

[11] Patent Number: 5,887,185
[45] Date of Patent: Mar. 23, 1999

[54] INTERFACE FOR COUPLING A FLOATING POINT UNIT TO A REORDER BUFFER

[75] Inventor: Thomas W. Lynch, Austin, Tex.

[73] Assignee: Advanced Micro Devices, Inc., Sunnyvale, Calif.

[21] Appl. No.: 820,960

[22] Filed: Mar. 19, 1997

[51] Int. Cl.⁶ .................................................. G06F 15/163
[52] U.S. Cl. .................... 395/800.23; 395/391; 395/392; 395/393; 395/394; 395/395; 395/309; 395/563
[58] Field of Search ............... 395/800.23, 391, 395/392, 393, 394, 395, 563

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |
| 5,546,599 | 8/1996 | Song | 395/800 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

S. Wallace, N. Dagli and N. Bagherzadeh, Design and Implementation of a 100 MHz Reorder Buffer, 37th Midwest Symposium on Circuit and Systems, Aug. 1994.

J. Lenell, S. Wallace and N. Bagherzadeh, A 20 MHz CMOS Reorder Buffer for a Super scalar Microprocessor, 4th NASA Symposium on VLSI Design, Oct. 1992.

M. Johnson, Superscalar Microprocessor Design, 1991.

V. Popescu, M. Schultz, J. Spraklen, G. Gibson, B. Lightner and D. Isaman, The Metaflow Architecture, IEEE Micro, Jun. 1991.

(List continued on next page.)

*Primary Examiner*—Larry D. Donaghue
*Assistant Examiner*—Catherine Pries
*Attorney, Agent, or Firm*—Conley, Rose & Tayon, PC; B. Noel Kivlin

[57] ABSTRACT

A microprocessor has an interface between a reorder buffer and a floating point unit, including a retire signal provided by the reorder buffer and a valid signal provided by the floating point unit. When the reorder buffer detects a floating point instruction which is ready to be retired, the reorder buffer pulses the retire signal. When the floating point unit executes the floating point instruction and produces a corresponding instruction result, the floating point unit pulses the valid signal. Upon assertion of both the retire signal and the valid signal, the floating point instruction is retired by the floating point unit. The reorder buffer retires the floating point instruction upon asserting the retire signal. Either the valid signal or the retire signal may be asserted first (in a temporal sense) for the floating point instruction. The receiving unit for the signal asserted first stores the signal in a shift register until the receiving unit detects the particular floating point instruction. The received signal pulse is then associated with the particular floating point instruction. Additionally, the interface may include a cancel signal provided by the reorder buffer in cases in which a floating point instruction is canceled, as well as an exception signal provided by the floating point unit instead of the valid signal if the particular floating point instruction experiences an exception. Finally, the interface may include a pair of signals for synchronizing the floating point unit and the reorder buffer upon detection of a floating point synchronization instruction.

20 Claims, 14 Drawing Sheets

U.S. PATENT DOCUMENTS

| | | | |
|---|---|---|---|
| 5,559,976 | 9/1996 | Song | 395/376 |
| 5,632,023 | 5/1997 | White | 395/394 |
| 5,651,125 | 7/1997 | Witt | 395/394 |
| 5,689,693 | 11/1997 | White | 395/565 |
| 5,721,855 | 2/1998 | Hinton | 395/394 |
| 5,721,945 | 2/1998 | Mills | 395/800 |
| 5,727,177 | 3/1998 | McMinn | 395/394 |
| 5,751,981 | 5/1998 | Witt | 395/380 |
| 5,764,938 | 6/1998 | White | 395/376 |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes on Intel P6," Byte, Jan. 1996, 4 pages.

1

INTERFACE FOR COUPLING A FLOATING POINT UNIT TO A REORDER BUFFER

BACKGROUND OF THE INVENTION

1. Field of the Invention

This invention relates to the field of microprocessors and, more particularly, to floating point units within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessors are configured to operate upon various data types in response to various instructions. For example, certain instructions are defined to operate upon an integer data type. The bits representing an integer form the digits of the integer number. The decimal point is assumed to be to the right of the digits (i.e. integers are whole numbers). Another data type often employed in microprocessors is the floating point data type. Floating point numbers are represented by a significand and an exponent. The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the right of the decimal, and the remaining bits to the left of the decimal. The bit to the right of the decimal is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (IEEE) standard 754. Floating point instructions, therefore, are instructions having at least one operand of the floating point data type.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE 754 comprises 32 bits (a one bit sign, an 8 bit biased exponent, and a 24 bit significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Many microprocessor architectures define the floating point instructions and operation thereof in such a way that a coprocessor-style design is favored. For example, the x86 microprocessor architecture defines the floating point in this manner. A coprocessor typically executes instructions provided by the processor relatively independent of the processor. An interface between the floating point unit and the integer portion of the microprocessor is therefore needed which preserves the independence of the floating point unit even though the floating point unit is integrated into the microprocessor.

SUMMARY OF THE INVENTION

The problems outlined above are in large part solved by an interface between a reorder buffer and a floating point unit in accordance with the present invention. The interface comprises at least a retire signal provided by the reorder buffer and a valid signal provided by the floating point unit. When the reorder buffer detects a particular floating point instruction which is ready to be retired (via retirement or execution of the instructions prior to the particular floating point instruction), the reorder buffer pulses the retire signal. When the floating point unit executes the particular floating point instruction and produces a corresponding instruction result, the floating point unit pulses the valid signal. Upon assertion of both the retire signal and the valid signal, the particular floating point instruction is retired by the floating point unit. On the other hand, the reorder buffer discards the particular floating point instruction upon asserting the retire signal, thereby allowing subsequent integer instructions to be retired. If a second floating point instruction is encountered by the reorder buffer prior to receiving an asserted valid signal corresponding to the particular floating point instruction, the reorder buffer does not assert the retire signal in response to the floating point instruction if exceptions are enabled. Either the valid signal or the retire signal may be asserted first (in a temporal sense) for the particular floating point instruction. The receiving unit for the signal asserted first stores the signal in a shift register until the receiving unit detects the particular floating point instruction. The received signal pulse is then associated with the particular floating point instruction.

Advantageously, either the floating point unit or the reorder buffer may get "ahead" with respect to floating point instructions, indicating the ability to retire multiple floating point instructions. For example, the floating point unit may queue multiple instruction results in a result buffer and may pulse the valid signal for each of the corresponding floating point instructions. The floating point unit may then continue executing subsequent floating point instructions while awaiting retirement indications for the corresponding floating point instructions. Alternatively, if exceptions are masked, the floating point unit may assert the valid signal for an instruction upon receiving that instruction. The floating point unit thereby operates relatively independent of the reorder buffer, executing instructions with respect to internal pipeline controls but unaffected by external controls (from the reorder buffer, for example). However, the interface allows for the correct retirement or discard of floating point instructions with respect to integer instructions.

Additionally, the interface may include a cancel signal provided by the reorder buffer in cases in which a floating point instruction is canceled. Like the retire signal, the cancel signal is pulsed once for each floating point instruction to be canceled. The interface may still further include an exception signal provided by the floating point unit instead of the valid signal if the particular floating point instruction experiences an exception. Finally, the interface may include a pair of synchronization signals for synchronizing the floating point unit and the reorder buffer upon detection of a floating point synchronization instruction.

Broadly speaking, the present invention contemplates a microprocessor comprising a reorder buffer and a floating point unit. The reorder buffer is configured to store instruction results corresponding to a plurality of instructions. Additionally, the reorder buffer is configured to store a plurality of floating point indications, each of which is indicative, in a first state, that a corresponding one of the plurality of instructions is a floating point instruction. The reorder buffer is configured to assert a retire signal upon selecting a particular floating point instruction for retirement. Coupled to the reorder buffer, the floating point unit is configured to execute floating point instructions. Furthermore, the floating point unit is configured to assert a valid signal upon generating a floating point result corresponding to the particular floating point instruction. The floating point unit is coupled to receive the retire signal and the reorder buffer is coupled to receive the valid signal. The floating point unit is configured to retire the particular floating point instruction once both the retire signal and the valid signal have been asserted. The reorder buffer retires the particular floating point instruction once the retire signal is asserted. Additionally, the floating point unit is configured to assert the valid signal for the particular floating point instruction even if the retire signal has yet to be asserted for the particular floating point instruction. Still further, the reorder buffer is configured to assert the retire signal for the particular floating point instruction even if the valid signal has yet to be asserted for the particular floating point instruction.

The present invention further contemplates a method for performing a floating point instruction in a microprocessor. An indication of the floating point instruction is stored in a reorder buffer within the microprocessor. The floating point instruction is dispatched to a floating point unit within the microprocessor. The reorder buffer asserts a retire signal to the floating point unit upon selecting the floating point instruction for retirement. The floating point unit asserts a valid signal to the reorder buffer upon generating a floating point result corresponding to the floating point instruction within the floating point unit. The floating point unit stores the floating point result into a register within the floating point unit once both the valid signal and the retire signal have been asserted. The floating point instruction is discarded from the reorder buffer once the retire signal has been asserted.

The present invention still further contemplates a microprocessor comprising a reorder buffer, a floating point unit, a first conductor, a second conductor, a third conductor, a fourth conductor, a fifth conductor, and a sixth conductor. The reorder buffer is configured to store instruction results corresponding to a plurality of instructions. Additionally, the reorder buffer is configured to store a plurality of floating point indications, each one of which is indicative, in a first state, that a corresponding one of the plurality of instructions is a floating point instruction. Coupled to the reorder buffer, the floating point unit is configured to execute floating point instructions and to generate a floating point result corresponding to the particular floating point instruction. The first, second, third, fourth, fifth, and sixth conductors are coupled between the reorder buffer and the floating point unit. The reorder buffer is configured to assert a retire signal upon the first conductor upon selecting the particular floating point instruction for retirement. The floating point unit is configured to assert a valid signal upon the second conductor upon generating the floating point result if the particular floating point instruction does not experience an exception. The floating point unit is configured to assert an exception signal upon the third conductor upon generating the floating point result if the particular floating point instruction does experience the exception. The reorder buffer is configured to assert a cancel signal upon the fourth conductor upon selecting the particular floating point instruction for retirement and the particular floating point instruction is canceled. The reorder buffer is further configured to assert a wait signal upon the fifth conductor upon selecting a floating point synchronization instruction for retirement. Finally, the floating point unit is configured to assert a sync signal upon the sixth conductor upon executing the floating point synchronization instruction. The floating point unit is configured to retire the particular floating point instruction once both the retire signal and the valid signal have been asserted. The reorder buffer is configured to retire the particular floating point instruction upon assertion of the retire signal. Additionally, the floating point unit is configured to assert the valid signal for the particular floating point instruction even if the retire signal has yet to be asserted for the particular floating point instruction. Still further, the reorder buffer is configured to assert the retire signal for the particular floating point instruction even if the valid signal has yet to be asserted for the particular floating point instruction.

BRIEF DESCRIPTION OF THE DRAWINGS

Other objects and advantages of the invention will become apparent upon reading the following detailed description and upon reference to the accompanying drawings in which.

Figure 1:
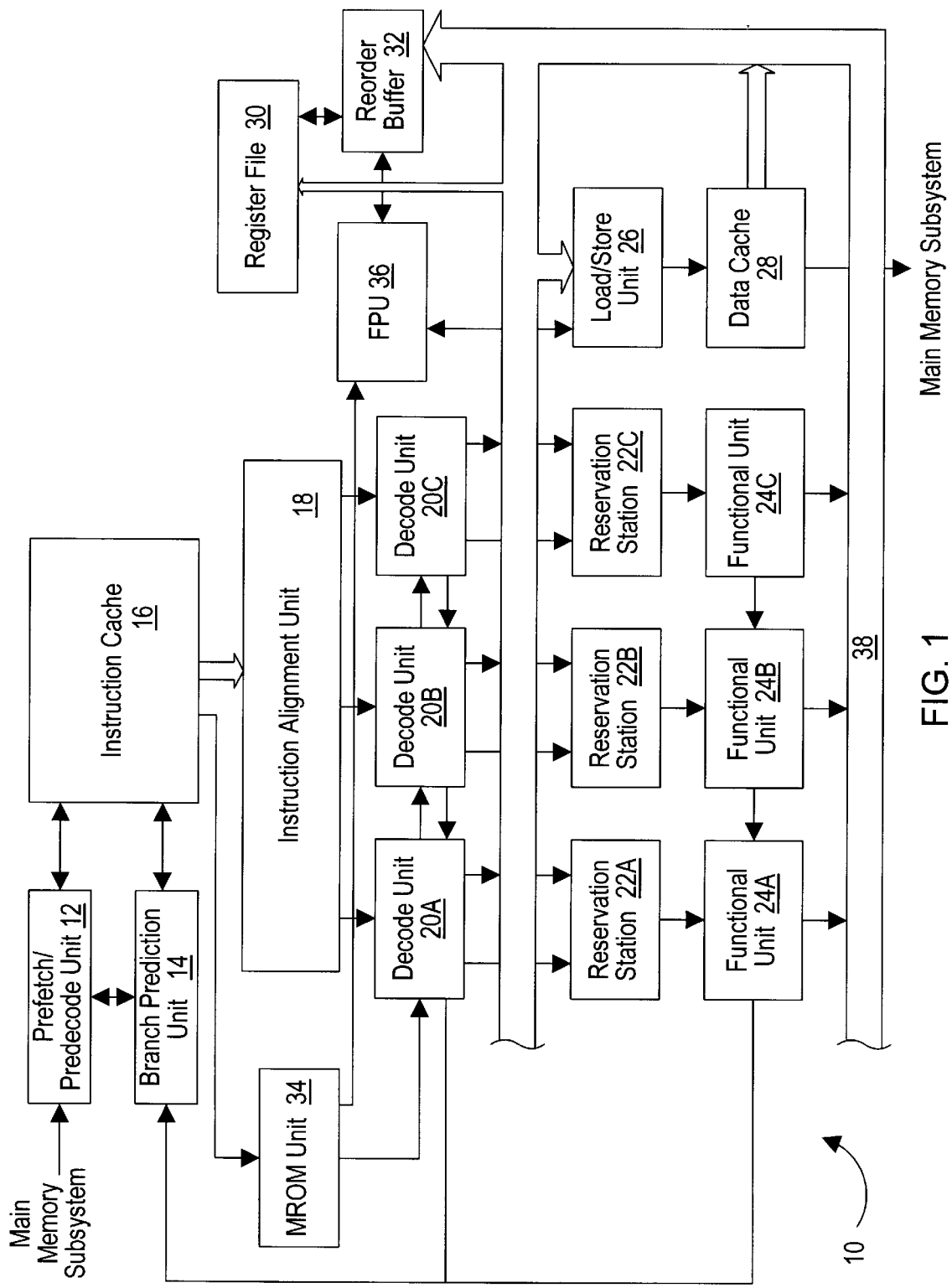
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

Generally speaking, FPU 36 is configured to execute floating point instructions. In one embodiment, FPU 36 operates in a coprocessor fashion, receiving instructions from MROM unit 34 and executing those instructions. Load/store unit 26 provides memory operands to FPU 36 for those instructions that use a memory operand. Register operands, on the other hand, are provided from a register stack within FPU 36. If the destination of the instruction is a floating point register, then instruction results are not conveyed external to FPU 36, but are instead handled within FPU 36. Reorder buffer 32 tracks the program order of floating point instructions with integer instructions in the program sequence being executed by microprocessor 10, and handles exceptions generated by the floating point instructions or the integer instructions. Reorder buffer 32 and FPU 36 use several signals to form a loosely coupled interface allowing FPU 36 to retain independence from reorder buffer 32 while still providing predictable behavior.

Reorder buffer 32, upon a floating point instruction being selected for retirement, asserts a retire signal to FPU 36. FPU 36, upon completion of a floating point instruction which does not experience an exception, asserts a valid signal to reorder buffer 32. The assertion of the retire signal and valid signal may occur in any order for a given instruction. In this manner, either FPU 36 or reorder buffer 32 may "get ahead" of the other. The synchronization between FPU 36 and reorder buffer 32 is loose but operates properly when there are potentially exceptions on floating point instructions (i.e. floating point exceptions are not masked). FPU 36 stores assertions of the retire signal if there are no instructions which have completed execution within FPU 36 and awaiting storage of the corresponding instruction result into the register stack. Upon receiving an instruction result for an instruction, the queued retire indication is used. Similarly, if reorder buffer 32 is not storing any floating point instructions which have been selected for retirement and an asserted valid signal is received, reorder buffer 32 stores the asserted valid signal for association with a subsequently selected floating point instruction. Multiple assertions of the signals may be stored in this manner, allowing for either FPU 36 or reorder buffer 32 to indicate completion of multiple instructions prior to the other unit arriving at those instructions. A given instruction is retired by FPU 36 after it has received an assertion of both the retire signal and the valid signal. Reorder buffer 32, on the other hand, asserts the retire signal upon selecting the given instruction for retirement and discards the instruction. Subsequent instructions may then be retired, even if the valid signal has not yet been asserted. If exceptions are not masked, reorder buffer 32 does not retire a second floating point instruction until FPU 36 has asserted the valid signal for the given instruction. If exceptions are masked, reorder buffer 32 retires the second floating point instruction without regard to the assertion or lack thereof of the valid signal for the given instruction. FPU 36 stores the instruction result into the register stack upon retirement, while reorder buffer 32 discards the instruction. Advantageously, a flexible interface is provided between FPU 36 and reorder buffer 32 for handling floating point instructions. The interface allows FPU 36 to operate relatively independently while still providing predictable operation by retiring floating point instructions in program order with other instructions.

According to one embodiment, microprocessor 10 employs the x86 microprocessor architecture. The x86 microprocessor architecture defines floating point exceptions detected for a particular floating point instruction to be signaled upon the next floating point instruction in program order. Therefore, reorder buffer 32 may discard the particular floating point instruction upon asserting the retire signal to FPU 36 as long as FPU 36 has indicated the completion (via the valid signal) of any prior floating point instructions (in program order). Furthermore, if floating point exceptions are masked (a commonly used mode), then reorder buffer 32 may retire multiple floating point instructions without receiving valid indications from FPU 36.

According to one embodiment, the retire signal and the valid signal are asserted as single cycle pulses. Once the retire signal or valid signal has been pulsed with respect to a given instruction, the signal is deasserted. If the signal is not deasserted in a clock cycle subsequent to its assertion, then an additional instruction is being indicated as ready for retirement.

Additional signals employed by reorder buffer 32 include a cancel signal which indicates, when asserted, that a floating point instruction has been canceled. A particular floating point instruction may be canceled due to a previous instruction, in program order, experiencing an exception. As used herein, the term "exception" refers to an event experienced by a particular instruction which causes subsequent instructions within reorder buffer 32 to be discarded and a corrected instruction stream fetched. For example, a predicted branch instruction which is determined to be mispredicted is an exception experienced by the branch instruction. Instructions subsequent to the branch instruction are discarded and a new instruction stream is fetched according to the execution of the branch instruction. A second example of an exception is a lack of translation for a memory operand address. In this case, the processor vectors to an operating system routine which handles address translation facilities. If a floating point instruction itself experiences an exception, FPU 36 indicates so via assertion of an exception signal instead of the valid signal. Assertions of the exception signal may be queued by reorder buffer 32 similar to assertions of the valid signal.

The interface between FPU 36 and reorder buffer 32 further includes a wait signal asserted by reorder buffer 32 and a sync signal asserted by FPU 36. The wait and sync signals are used to synchronize completion of a floating point synchronization instruction. Unlike other instructions, the floating point synchronization instruction must be completed simultaneously by both reorder buffer 32 and FPU 36. Therefore, instead of pulsing the wait and sync signals, each of these signals is held asserted until a corresponding assertion of the other signal is detected. A clock cycle in which both signals are asserted indicates that the floating point synchronization instruction may be retired. Neither unit progresses to the next instruction in program order until the clock cycle in which both signals are asserted.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 parses the floating point instruction into a floating point operation which is transmitted to floating point unit 36 and one or more load/store operations for load/store unit 26 to perform to retrieve memory operands for the instruction. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
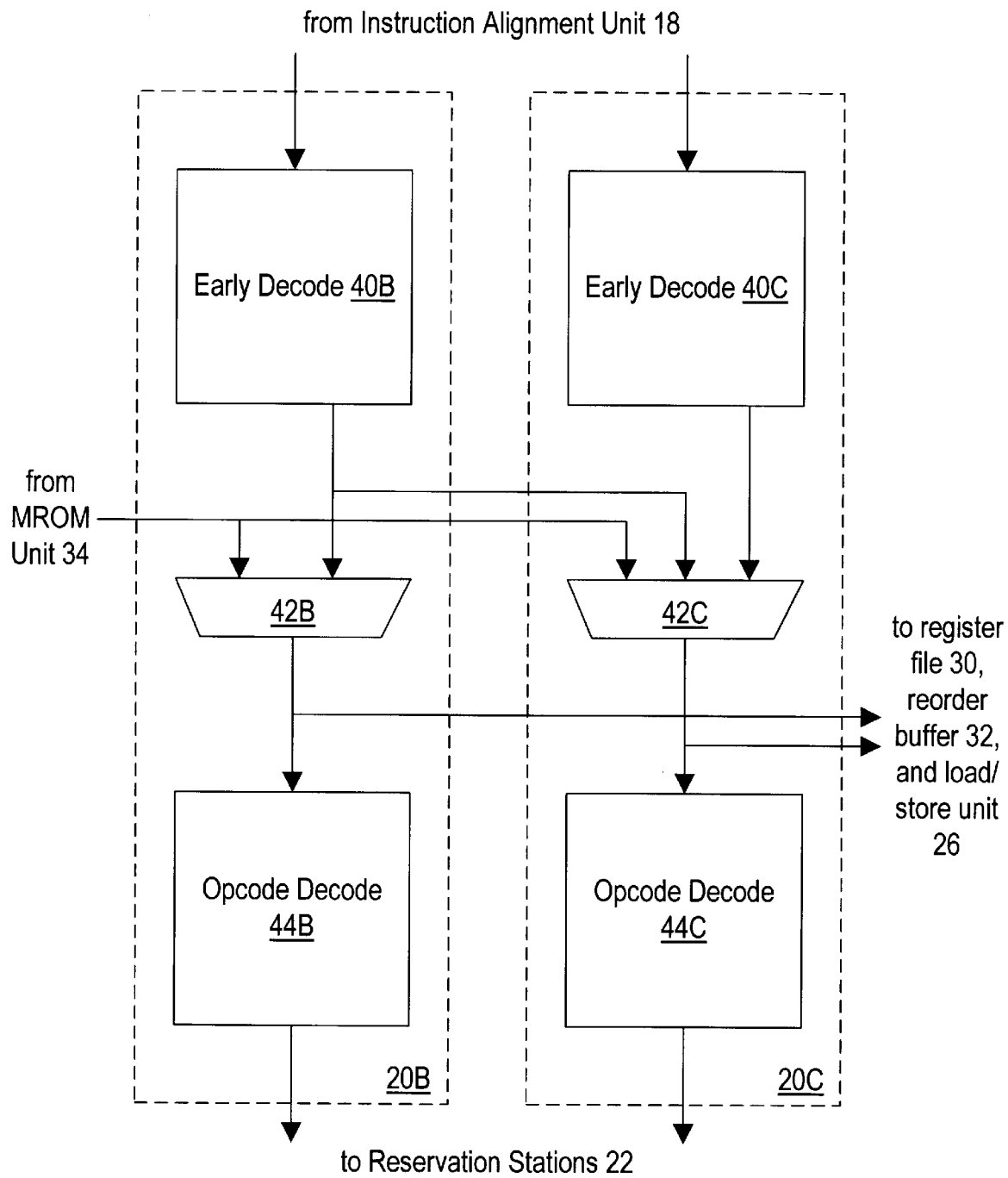
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
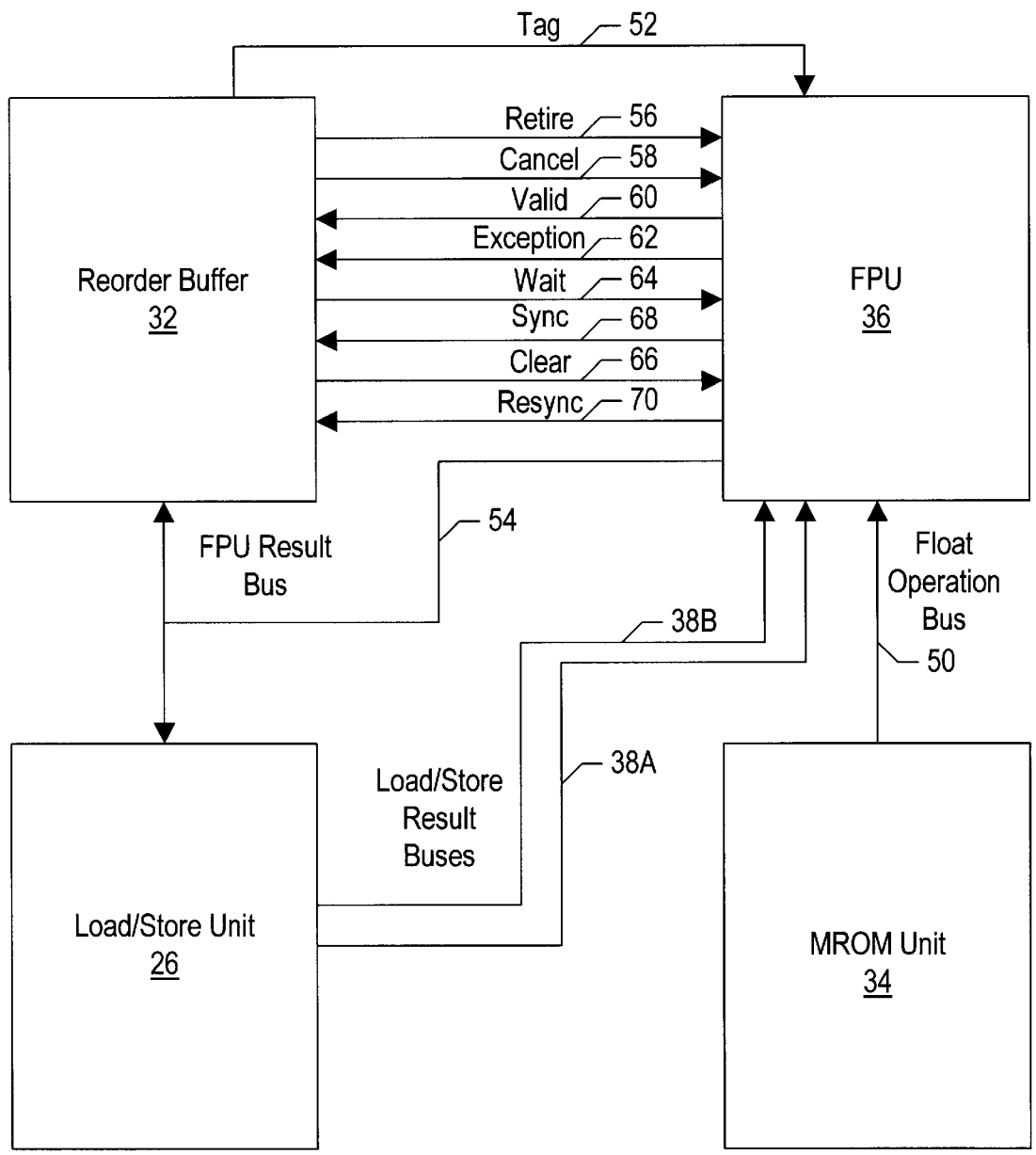
FIG. 3 is a block diagram of a floating point unit, a reorder buffer, a load/store unit, and an MROM unit shown in FIG. 1, highlighting interconnection therebetween according to one embodiment of the microprocessor.

Turning now to FIG. 3, a block diagram of load/store unit 26, reorder buffer 32, FPU 36, and MROM unit 34 is shown. Interconnection between the blocks is highlighted in FIG. 3 according to one embodiment of microprocessor 10. Additional interconnection may be provided as desired according to design choice.

As mentioned above, MROM unit 34 receives floating point instructions from instruction cache 16 and parses the floating point instruction into a floating point operation and memory operations to retrieve and store memory operands for the instructions. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operation upon a float operation bus 50 coupled between MROM unit 34 and FPU 36. The floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag assigned to the memory operations upon a tag bus 52 coupled between reorder buffer 32 and FPU 36. According to the present embodiment, reorder buffer 32 is a line-oriented reorder buffer as described above. For such an embodiment, reorder buffer 32 provides the line tag upon tag bus 52. Using the supplied tag, FPU 36 can identify the memory operand data as it is provided from load/store unit 26.

Load/store unit 26 provides memory operand data upon load/store result buses 38A and 38B. Result buses 38A and 38B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a reorder buffer tag identifying the data word. The reorder buffer tag comprises both the line and offset portions. The line portion identifies the floating point instruction to which the data word belongs, and the offset portion defines the portion of the memory operand being provided by the data word. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 54 to load/store unit 26 for storage. Additionally, a floating point instruction is defined which causes a floating point value to be stored into an integer register (specifically, the AX register of the x86 microprocessor architecture, in one embodiment). FPU result bus 54 is therefore coupled to reorder buffer 32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an interface between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled interface are shown in FIG. 3. A retire signal is conveyed by reorder buffer 32 upon a retire conductor 56 coupled to FPU 36. Reorder buffer 32 conveys a cancel signal upon a cancel conductor 58 coupled to FPU 36. FPU 36 conveys a valid signal upon a valid conductor 60 and an exception signal upon an exception conductor 62, both of which are coupled to reorder buffer 32. Reorder buffer 32 provides a wait signal upon a wait conductor 64 and a clear signal upon a clear conductor 66, both of which are coupled to FPU 36. Finally, FPU 36 provides a sync signal upon a sync conductor 68 and a resync signal upon a resync conductor 70, both of which are coupled to reorder buffer 32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36) via assertion of the cancel signal. FPU 36 may be configured to store an assertion of the retire signal until the corresponding instruction is completed by FPU 36 (i.e. until the instruction exits the execution pipeline of FPU 36). Once the retire signal has been asserted for a given instruction, FPU 36 may proceed with updating the destination register with the result of the instruction (provided certain floating point exceptions are masked off).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU 36 deletes any speculative state stored therein.

Figure 4:
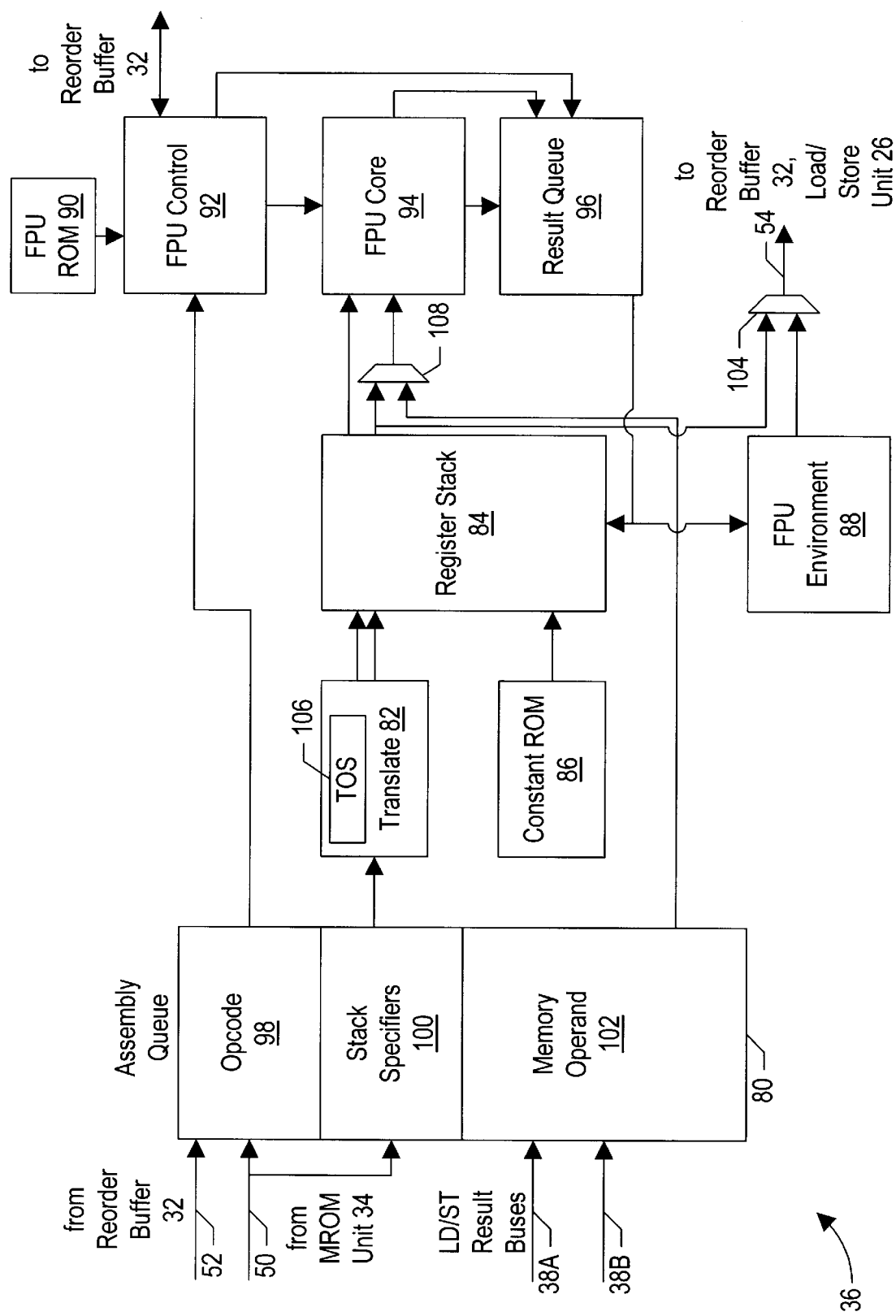
FIG. 4 is a block diagram of one embodiment of the floating point unit shown in FIG. 3.

Turning next to FIG. 4, a block diagram of one embodiment of FPU 36 is shown. As shown in FIG. 4, FPU 36 includes an assembly queue 80, and translate unit 82, a register stack 84, a constant read-only memory (ROM) 86, an FPU environment unit 88, an FPU ROM 90, an FPU control unit 92, and FPU core 94, and a result queue 96. Assembly queue 80 comprises multiple queue entries, each of which is configured to store instruction information corresponding to one instruction. As shown in FIG. 4, assembly queue 80 includes several fields for each entry. An opcode field 98 is included for storing the opcode of the floating point instruction and the corresponding reorder buffer tag, and a stack specifiers field 100 is included for storing register specifiers which select storage locations within register stack 84. The selected registers provide operands for the corresponding instructions. The values stored in opcode field 98 and stack specifier field 100 are received by FPU 36 upon float operation bus 50 from MROM unit 34 and tag bus 52 from reorder buffer 32. Assembly queue 80 further includes a memory operand field 102 for storing a memory operand used by the instruction. The memory operand is received upon load/store result buses 38A and 38B.

Assembly queue 80 is coupled to FPU control unit 92 and to translate unit 82. Translate unit 82 is coupled to register stack 84, which is further coupled to constant ROM 86, result queue 96, and FPU core 94. FPU environment 88 is coupled to result queue 96 and is coupled to provide, through multiplexor 104, a result upon FPU result bus 54. Register stack 84 may also provide a result upon FPU result bus 54 through multiplexor 104. If there are no updates outstanding within FPU 36, register stack 84 provides the value through multiplexor 104. Alternatively, if there are updates outstanding within FPU 36, result queue 96 may provide the value. Other implementations for forwarding values may be employed as well. FPU control unit 92 is coupled to FPU ROM 90, result queue 96, and FPU core 94. FPU core 94 is further coupled to result queue 96. FPU control unit 92 is further coupled to receive the signals forming the interface between FPU 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. Upon exit from the execution pipeline, the results of the instruction are stored into result queue 96. The results are held in result queue 96 until a retire indication is received from reorder buffer 32. Upon receipt of the retire indication, the results are stored into register stack 84.

When an instruction is dispatched into the execution pipeline, the stack specifiers for the instruction are conveyed to translate unit 82. FPU 36 uses a stack-based register file in which one of the registers is defined to be the top of the stack. Certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is sometimes dependent upon the instructions which execute prior to that instruction (since these instructions may affect which register is the top of the stack). Translate unit 82 maps the stack specifiers to the registers within register stack 84 based upon a speculative top of stack value which reflects execution of the instructions prior to a particular instruction in program order (including the instructions still within the execution pipeline of FPU 36). A top of stack (TOS) register 106 is included for storing the top of stack indicator. Additionally, a table is provided within translate unit 82 for mapping each stack-relative register specifier to a storage location within register stack 84. Registers may become out of order in the stack due to an exchange instruction which exchanges the contents of a pair of registers. Such an instruction may be implemented by swapping their addresses within the table instead of physically swapping the contents of the corresponding registers.

Translate unit 82 provides the translated register specifiers to register stack 84, which reads the values from the corresponding register locations and provides the values to FPU core 94. The memory operand for the instruction may be substituted for one of the operands from register stack 84 via multiplexor 108. Register stack 84 includes the architected FPU registers defined by the microprocessor architecture employed by microprocessor 10. For example, embodiments of microprocessor 10 employing the x86 microprocessor architecture include eight architected registers within register stack 84. Additionally, register stack 84 may include temporary registers for use by floating point microcode routines stored in FPU ROM 90, as described below. In one embodiment, 24 temporary registers are included.

FPU core 94 includes the hardware used to manipulate the source operands of the floating point instruction in order to produce the result of the instruction. For example FPU core 94 includes a multiplier for multiplying the input operands, an adder for adding the input operands, etc. FPU core routes the operands to the various pieces of hardware in response to control signals from FPU control unit 92. FPU control unit 92 receives the opcode for a given instruction from assembly queue 80 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 92 handles the interface to reorder buffer 32 and communicates with other elements of FPU 36 according to communications upon the interface. For example, when a particular instruction receives a retire indication, FPU control unit 92 communicates with result queue 96 to cause the corresponding instruction result to be stored into register stack 84. If the instruction has not yet been completed, result queue 96 queues the retire indication until the instruction is completed.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 90. Effectively, the transcendental instructions make multiple passes through the execution pipeline in order to complete. Intermediate results are calculated by the instructions within the microcoded routine, and the final result is formed by calculating upon the intermediate results.

The microcoded routines may make use of a set of constants stored in constant ROM 86. The constants stored in constant ROM 86 are useful in calculating results for the transcendental instructions. For example, the floating point representations of 1, 0, −1, Pi, etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

FPU environment 88 stores control and status information regarding the state of FPU 36. A control word may be stored which indicates the rounding and precision modes of FPU 36 as well as a mask for various floating point exceptions. A status word may also be stored which indicates which floating point exceptions have been detected, the top of stack pointer, etc.

According to one particular embodiment, FPU 36 executes instructions in program order. The instructions are received into assembly queue 80 in program order, and are provided into the execution pipeline of FPU 36 in program order as well. An instruction may be ready for execution within assembly queue 80 (i.e. all operands provided) but may remain stored therein because another instruction prior the instruction in program order is not ready for execution. In other words, assembly queue 80 dispatches instructions in program order. Similarly, results are stored from result queue 96 into register stack 84 and/or FPU environment 88 in program order. According to another embodiment, assembly queue 80 operates similar to reservation stations 22 and result queue 96 operates similar to reorder buffer 32. In such an embodiment, FPU 36 may execute instructions out of order.

Figure 5:
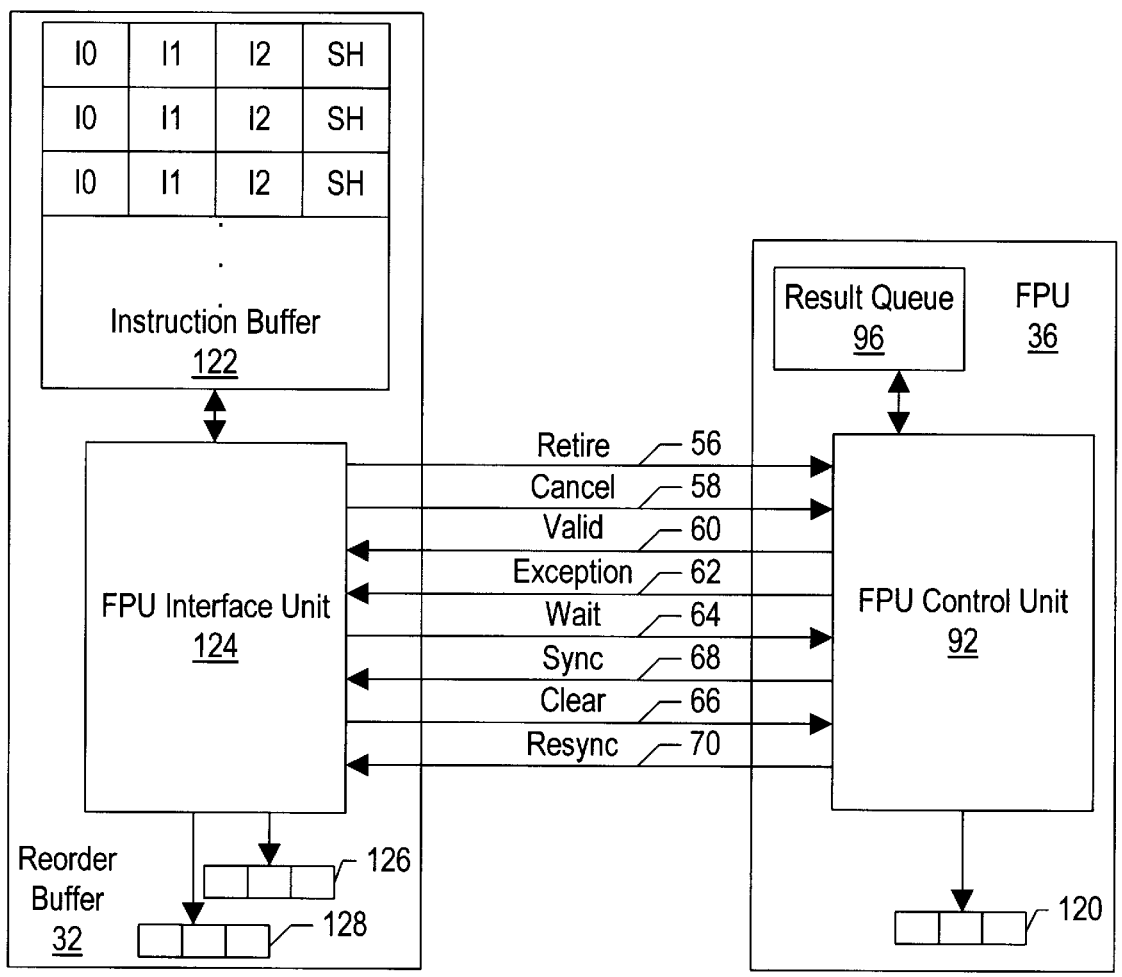
FIG. 5 is a block diagram illustrating one embodiment of an interface between the reorder buffer and the floating point unit shown in FIG. 3.

Turning next to FIG. 5, a block diagram of portions of one embodiment of reorder buffer 32 and FPU 36 are shown. Only portions of reorder buffer 32 and FPU 36 which are involved in operating the interface therebetween are shown in FIG. 5. FPU 36 includes result queue 96 and FPU control unit 92 as shown in FIG. 4, as well as a retire shift register 120. Reorder buffer 32 includes an instruction buffer 122, an FPU interface unit 124, a valid shift register 126, and an exception shift register 128. Result queue 96 is coupled to FPU control unit 92 which is further coupled to retire shift register 120. FPU interface unit 124 is coupled to instruction buffer 122, valid shift register 126, and exception shift register 128. In addition, both FPU control unit 92 and FPU interface unit 124 are coupled to conductors 56, 58, 60, 62, 64, 66, 68, aand 70.

FPU interface unit 124 and FPU control unit 92 control the corresponding signals upon the interface conductors 56–70 to effect the retirement of floating point instructions. Generally speaking, FPU interface unit 124 examines instruction information corresponding to the instruction or instructions which are foremost in program order among the instructions represented in instruction buffer 122. The foremost instructions are the next instructions to be retired, once they have been executed and have provided results to reorder buffer 32. If the foremost instruction is a floating point instruction and the instruction is not canceled due to an exception detected for a previous instruction, then FPU interface unit 124 asserts the retire signal for the instruction. However, if exceptions are not masked, FPU interface unit 124 withholds assertion of the retire signal if FPU 36 has not yet asserted the valid signal for a previously retired floating point instruction. If the foremost instruction is a floating point instruction but is marked canceled, FPU interface unit 124 asserts the cancel signal. Upon assertion of either the retire or cancel signals, FPU interface unit 124 retires the floating point instruction (i.e. discards the floating point instruction).

FPU control unit 92 similarly examines the instruction results stored in result queue 96. If an instruction result is stored therein and a corresponding valid or exception signal has yet to be asserted, FPU control unit 92 asserts the valid signal or the exception signal based upon whether or not the instruction experiences an exception. However, the instruction result is not stored into the register stack until the corresponding retire signal is received from FPU interface unit 124. Alternatively, FPU interface unit 124 may receive a cancel signal corresponding to the instruction. In that case, the instruction is discarded and the register stack is not updated.

Since FPU 36 in the present embodiment executes instructions in order, an assertion of a single signal can be associated with the correct instruction (i.e. no tag is needed). If there are no floating point instructions which are foremost in program order within reorder buffer 32, then an indication of the signals from FPU control unit 92 may be queued in valid shift register 126 and exception shift register 128. Subsequently, when FPU interface unit 124 discovers a floating point instruction in position within instruction buffer 122 for retirement, FPU interface unit 124 may assert the retire signal and the instruction may be retired. Both valid shift register 126 and exception shift register 128 are shifted when a floating point instruction is retired, such that the corresponding assertions of the valid or exception signals are discarded from valid shift register 126 and exception shift register 128, respectively. More particularly, FPU interface unit 124 examines the indications stored at the head of the shift registers 126 and 128. If an assertion of either the valid signal or the cancel signal is stored at the head of the corresponding shift register 126 or 128, then that indication is used for the floating point instruction.

According to one embodiment, if exceptions are masked, FPU 36 asserts the valid signal for each instruction as that instruction is received by FPU 36. Since exceptions are masked, no activity within FPU 36 can cause the floating point instruction not to complete. FPU interface unit 124 queues the asserted valid signals, and controls retirement of the instructions using the retire signal. Once the retire signal has been asserted for a given instruction, FPU 36 will retire the instruction upon completion thereof (i.e. FPU 36 need not have the instruction completed when the retire signal is asserted for that instruction.

Similarly, if there are no instruction results within result queue 96 upon assertion of the retire signal, FPU control unit 92 queues an indication of the retire signal in retire shift register 120. Subsequently, when an instruction result is placed into result queue 96, the queued indication can be shifted out of retire shift register 120. FPU control unit 92 then asserts either the valid or the exception signal and retires the instruction result accordingly. In the present embodiment, FPU 36 does not queue cancel indications. Instead, FPU control unit 92 searches for the affected instruction (i.e. the first instruction within FPU 36 in program order) and cancels the instruction.

Alternatively, FPU control unit 92 may queue the cancel indications in a manner similar to queuing retire indications. As the canceled instructions clear the execution pipeline of FPU 36, the canceled instructions are discarded from result queue 96 instead of retired. In such an embodiment, restoration of the table within translate unit 82 (for an canceled FXCH instructions) may not be completed prior to the arrival of instructions subsequent to the canceled instructions (i.e. instructions fetched from the corrected instruction stream). If the table is still to be restored when the subsequent instructions arrive, the subsequent instructions may be stalled. Similarly, other speculatively updated resources for which restoration has not been completed may cause the subsequent instructions to stall.

Because the retire, valid, and exception indications are queued by the receiving units and the cancel indication is effected without delay, the retire, cancel, valid, and exception signals may be pulsed for a single clock cycle instead of remaining asserted until a corresponding assertion from the receiving unit. Advantageously, reorder buffer 32 may indicate the ability to retire multiple floating point instructions prior to actually retiring the instructions. Similarly, FPU unit 36 may indicate the completion of multiple instructions prior to reorder buffer 32 selecting the instructions for retirement. Either unit may get "ahead" of the other. It is noted that, in one embodiment, the interface signals may actually be asserted one clock cycle early due to the transit time between reorder buffer 32 and FPU 36.

According to the embodiment shown in FIG. 5, instruction buffer 122 comprises a line-oriented reorder buffer. A line of instructions may contain up to three concurrently decoded integer instructions, illustrated as fields I0, I1, and I2 within the exemplary lines illustrated in FIG. 5. Additionally, a shared (SH) field is included which stores shared information for the line. For example, the program counter addresses which locate the instructions in memory may be stored in the shared field. Still further, the shared field includes a floating point indication. The floating point indication identifies whether or not a floating point instruction is represented by the line. The floating point instruction is an MROM instruction and occupies the line. If the floating point instruction uses a memory operand, MROM unit 34 places the load memory operations into the I0, I1, and I2 positions of the line representing the floating point instruction. Additionally, the code segment selector and instruction pointer address corresponding to the floating point instruction are stored in the shared field. Since floating point exceptions are signalled on the instruction following the instruction which generates the exception, two copies of the retired code selector and instruction pointer are maintained by reorder buffer 32 as well.

Instruction buffer 122 is a FIFO buffer. Therefore, FPU interface unit 124 may determine the floating point indication within the shared field of the line which forms the bottom of the buffer (i.e. the line which stores one or more instructions which are foremost, in program order, of the instructions represented within instruction buffer 122). If the floating point indication indicates that the line represents a floating point instruction, then FPU interface unit 124 asserts either the retire signal or the cancel signal to FPU 36. The retire signal is asserted unless the line contains a cancel indication indicating that the line has been canceled.

According to one embodiment, FPU interface unit 124 is configured to search not only the bottom of instruction buffer 124, but several lines above the bottom as well. In this manner, additional floating point instructions may be located. If the instructions represented within the lines between the line storing an additional floating point instruction and the bottom of instruction buffer 122 have been executed without experiencing an exception or cannot cause an exception and are not speculative, then the retire signal can be asserted for the additional floating point instruction. Similarly, FPU control unit 92 may be configured to search each entry of result queue 96 to determine if floating point results are stored therein for asserting the valid or exception signals.

FPU interface unit 124 and FPU control unit 92 employ a different signaling method for floating point synchronization instructions. The wait and sync signals are used to signal the retirement of the floating point synchronization instructions. Unlike other floating point instructions in which either reorder buffer 32 or FPU 36 may be allowed to get ahead with respect to indicating completion of instructions, the floating point synchronization instruction requires that both units synchronize. Therefore, the wait and sync signals are not pulsed in the manner that the retire, cancel, valid, and exception signals are pulsed. Instead, when FPU interface unit 124 encounters a floating point synchronization instruction, it asserts the wait signal and holds the wait signal asserted until the sync signal is asserted. Similarly, if FPU control unit 92 detects a floating point synchronization instruction within result queue 96, FPU control unit 92 asserts the sync signal and holds it asserted until the wait signal is asserted. In other words, both units stall on the floating point synchronization instruction until a clock cycle in which both the wait and sync signals are asserted.

Finally, FPU interface unit 124 causes FPU 36 to delete all speculative state (i.e. state corresponding to floating point instructions for which a retire assertion has not been received) by asserting the clear signal. Therefore, the clear signal acts as a reset for the floating point unit. Similarly, FPU control unit 92 causes reorder buffer 32 to discard all instructions with instruction buffer 122 which beyond the last retired floating point instruction by asserting the resync signal. Microprocessor 10 begins fetching instructions at the next x86 instruction following the last retired floating point instruction when the resync signal is asserted.

It is noted that shift registers 120, 126, and 128 may be alternatively implemented as counters. The counters would be incremented each time an assertion of the corresponding signal is received and decremented each time one of the counted assertions is associated with an instruction.

Figure 6:
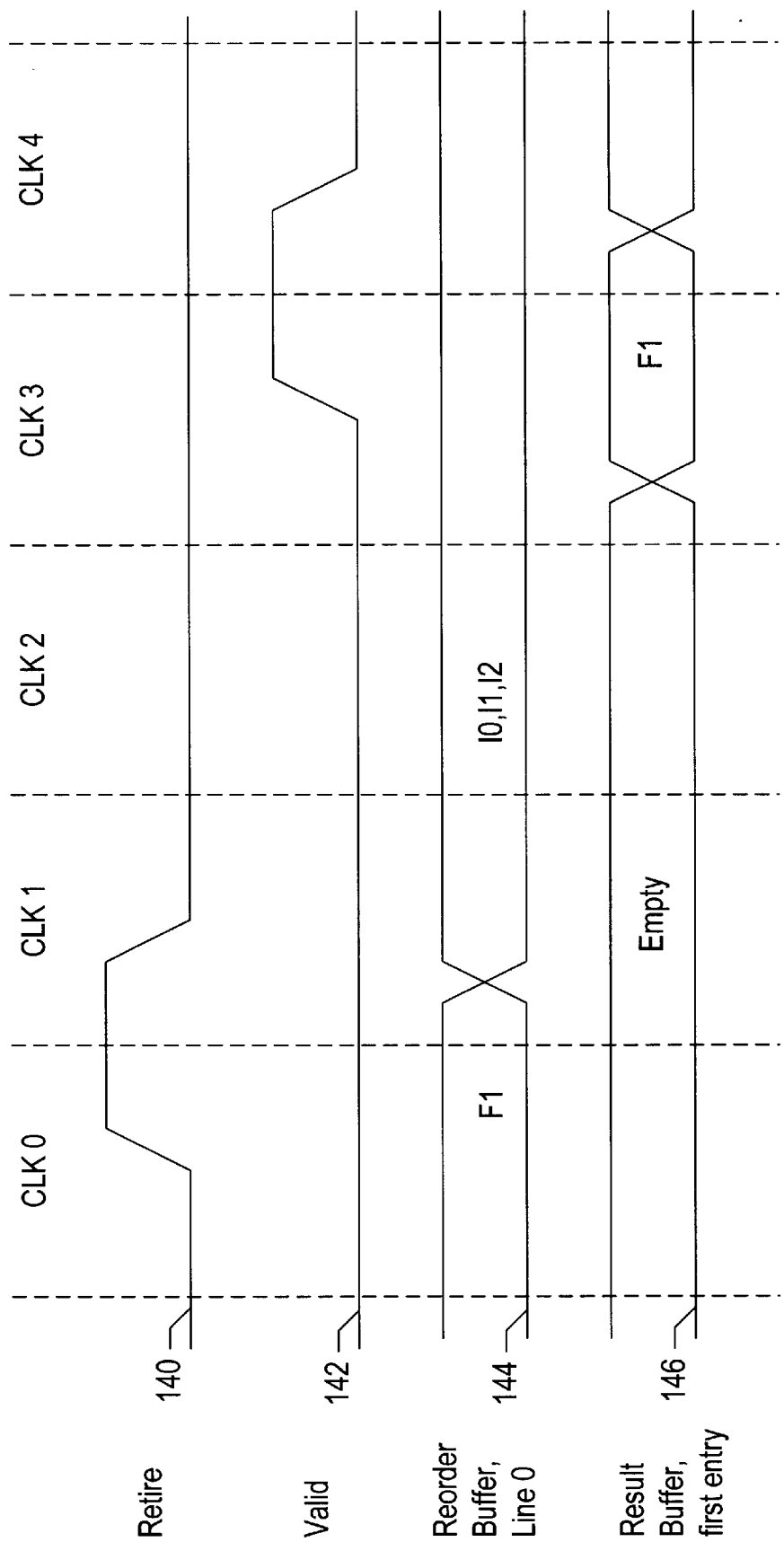
FIG. 6 is a timing diagram illustrating assertion of a retire signal prior to a corresponding assertion of a valid signal.

Turning now to FIG. 6, a timing diagram illustrating retirement of a floating point instruction F1 is shown. Clock cycles are delimited in FIG. 6 via vertical dashed lines, and each clock cycle is labeled consecutively from CLK0 to CLK4. The retire signal is shown via a waveform 140 and the valid signal is shown via a waveform 142. Additionally, the contents of reorder buffer line 0 (i.e. the line representing the instruction or instructions which are foremost, in program order, of the instructions within reorder buffer 32) are illustrated at reference number 144. Similarly, the contents of the first entry within result buffer 96 are illustrated at reference number 146.

During clock cycle CLK0, reorder buffer line 0 comprises the line representing floating point instruction F1. Therefore, FPU interface unit 124 pulses the retire signal upon retire conductor 56. The first entry of result buffer 96 is empty during clock cycle CLK0. FPU control unit 92 stores an indication that the retire signal has been pulsed in retire shift register 120. Since FPU interface unit 124 has pulsed the retire signal for floating point instruction F1, floating point instruction F1 is retired from reorder buffer 32. During clock cycle CLK3, result buffer 96 receives the instruction result corresponding to floating point instruction F1. Therefore, FPU control unit 92 asserts the valid signal during clock cycle CLK3. Since both the retire signal and the valid signal have been asserted for floating point instruction F1, result buffer 96 retires floating point instruction F1. Additionally, if exceptions are not masked, reorder buffer 32 notes the assertion of the valid signal during clock cycle CLK3 and associates the assertion with floating point instruction F1. In this manner, retirement of a floating point instruction subsequent to instruction F1 may be effected.

It is noted that reorder buffer line 0 as shown in FIG. 6 stores a set of three integer instructions I0, I1, and I2 during clock cycles CLK1–CLK4. Instructions I0, I1, and I2 are eligible for retirement with respect to floating point instruction F1. However, in FIG. 6 the instructions are not retired due to another dependency. For example, one or more of the instructions I0, I1, and I2 may not yet have executed in functional units 24.

Figure 7:
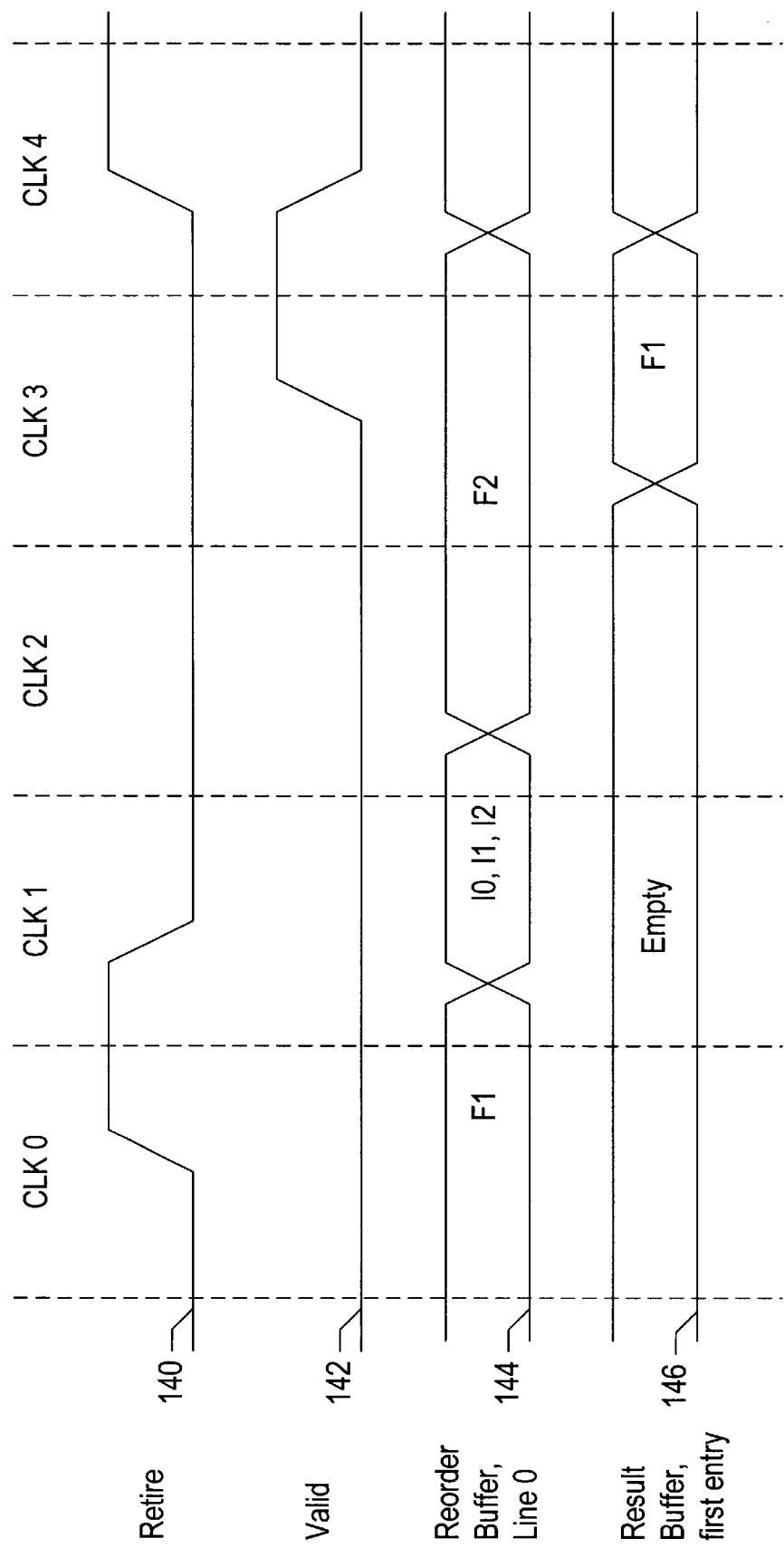
FIG. 7 is a timing diagram illustrating delayed assertion of the retire signal for a second floating point instruction until a first floating point instruction is validated by the floating point unit.

Turning now to FIG. 7, a timing diagram illustrating an example of retirement of a floating point instruction F1 and a subsequent floating point instruction F2 is shown for the case in which floating point exceptions are enabled and not masked. Clock cycles are delimited in FIG. 7 via vertical dashed lines, and each clock cycle is labeled consecutively from CLK0 to CLK4. Similar to FIG. 6, the retire signal is shown via waveform 140 and the valid signal is shown via waveform 142. Additionally, the contents of reorder buffer line 0 (i.e. the line representing the instruction or instructions which are foremost, in program order, of the instructions within reorder buffer 32) are illustrated at reference number 144. Similarly, the contents of the first entry within result buffer 96 are illustrated at reference number 146.

During clock cycle CLK0, reorder buffer line 0 comprises the line representing floating point instruction F1. Therefore, FPU interface unit 124 pulses the retire signal upon retire conductor 56. The first entry of result buffer 96 is empty during clock cycle CLK0. FPU control unit 92 stores an indication that the retire signal has been pulsed in retire shift register 120. Since FPU interface unit 124 has pulsed the retire signal for floating point instruction F1, floating point instruction F1 is retired from reorder buffer 32. Subsequently, a line of integer instructions I0, I1, and I2 are retired from reorder buffer 32 (during clock cycle CLK1).

During clock cycle CLK2, line 0 of reorder buffer 32 stores the line representing floating point instruction F2. However, since the valid signal corresponding to floating point instruction F1 has not yet been asserted and floating point exceptions are not masked, floating point instruction F2 cannot be retired. FPU 36 may detect an exception with respect to the execution of floating point instruction F1(which would be reported by asserting the exception signal for floating point instruction F2 ). Therefore, the retire assertion for floating point instruction F2 (and the retirement of floating point instruction F2 from reorder buffer 32) is delayed.

During clock cycle CLK3, result buffer 96 receives the instruction result corresponding to floating point instruction F1. Therefore, FPU control unit 92 asserts the valid signal during clock cycle CLK3. Since both the retire signal and the valid signal have been asserted for floating point instruction F1, result buffer 96 retires floating point instruction F1. Additionally, reorder buffer 32 notes the assertion of the valid signal during clock cycle CLK3 and associates the assertion with floating point instruction F1. Retirement of floating point instruction F2 may therefore proceed. Reorder buffer 32 retires floating point instruction F2 and asserts the retire signal therefor during clock cycle CLK4. It is noted that, especially for lower frequency implementations of microprocessor 10, the retire assertion may occur coincident with the valid assertion during clock cycle CLK4.

Figure 8:
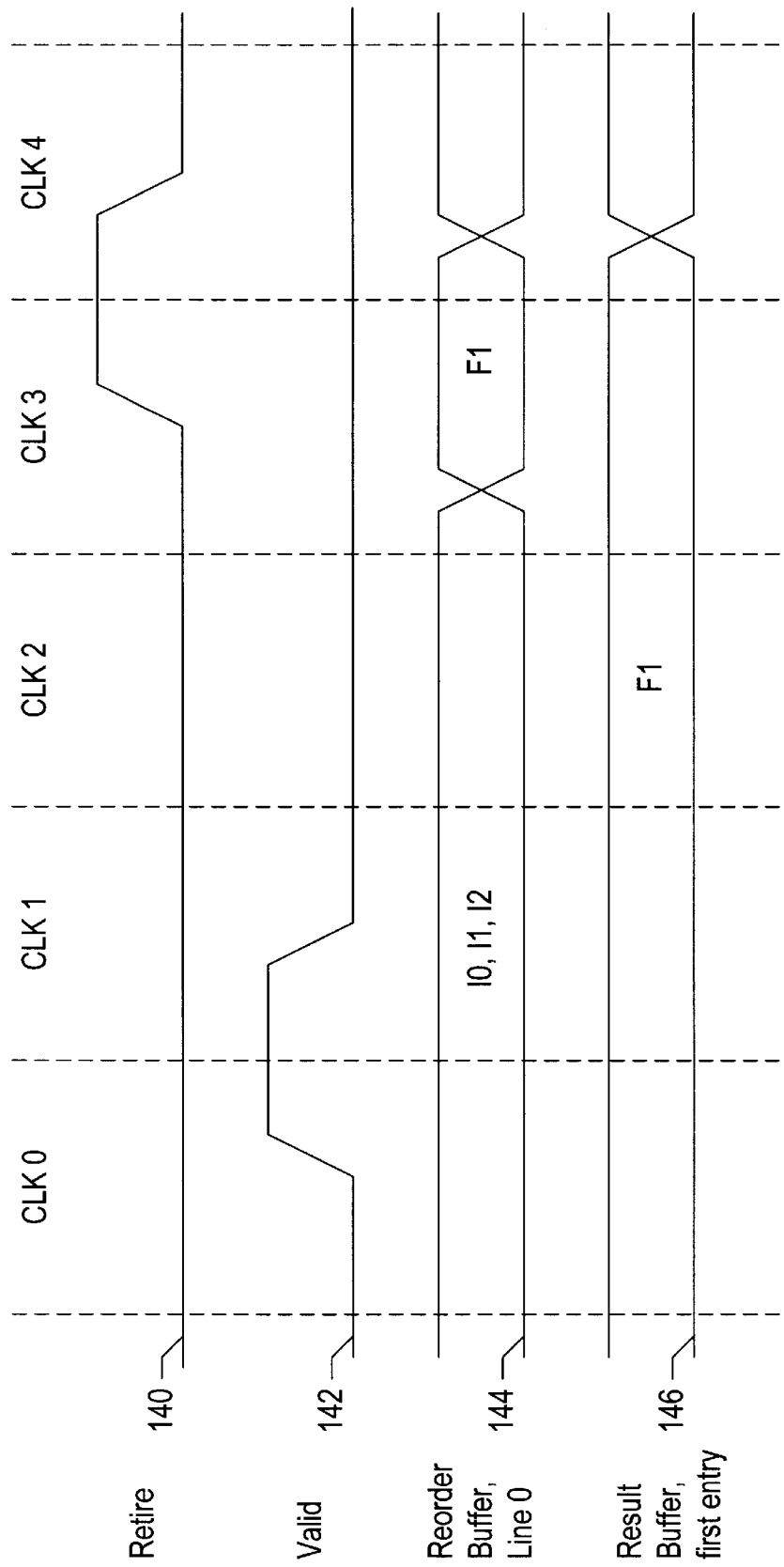
FIG. 8 is a timing diagram illustrating assertion of the valid signal prior to the corresponding assertion of the retire signal.

Turning now to FIG. 8, a timing diagram illustrating yet another example of retirement of a floating point instruction F1 is shown. Clock cycles are delimited in FIG. 8 via vertical dashed lines, and each clock cycle is labeled consecutively from CLK0 to CLK4. Similar to FIG. 6, the retire signal is shown via waveform 140 and the valid signal is shown via waveform 142. Additionally, the contents of reorder buffer line 0 (i.e. the line representing the instruction or instructions which are foremost, in program order, of the instructions within reorder buffer 32) are illustrated at reference number 144. Similarly, the contents of the first entry within result buffer 96 are illustrated at reference number 146.

In the example of FIG. 8, the instruction result corresponding to floating point instruction F1 arrives in result buffer 96 prior to the floating point instruction F1 arriving in line zero of reorder buffer 32. Since in clock cycle CLK0, the result corresponding to floating point instruction F1 is stored in the first entry of result buffer 96 and the valid signal has not yet been asserted for the corresponding instruction, FPU control unit 92 asserts the valid signal during clock cycle CLK0. As shown in FIG. 8, reorder buffer line 0 contains fixed point instructions I0, I1, and I2 during clock cycles CLK0, CLK1, and CLK2. Therefore, FPU interface unit 124 stores an indication of the asserted valid signal in valid shift register 126. During clock cycle CLK3, however, floating point instruction F1 arrives in reorder buffer line 0 via retirement of instructions I0, I1, and I2. Therefore, FPU interface unit 124 asserts the retire signal during clock cycle CLK3. Floating point instruction F1 is thereby retired.

Figure 9:
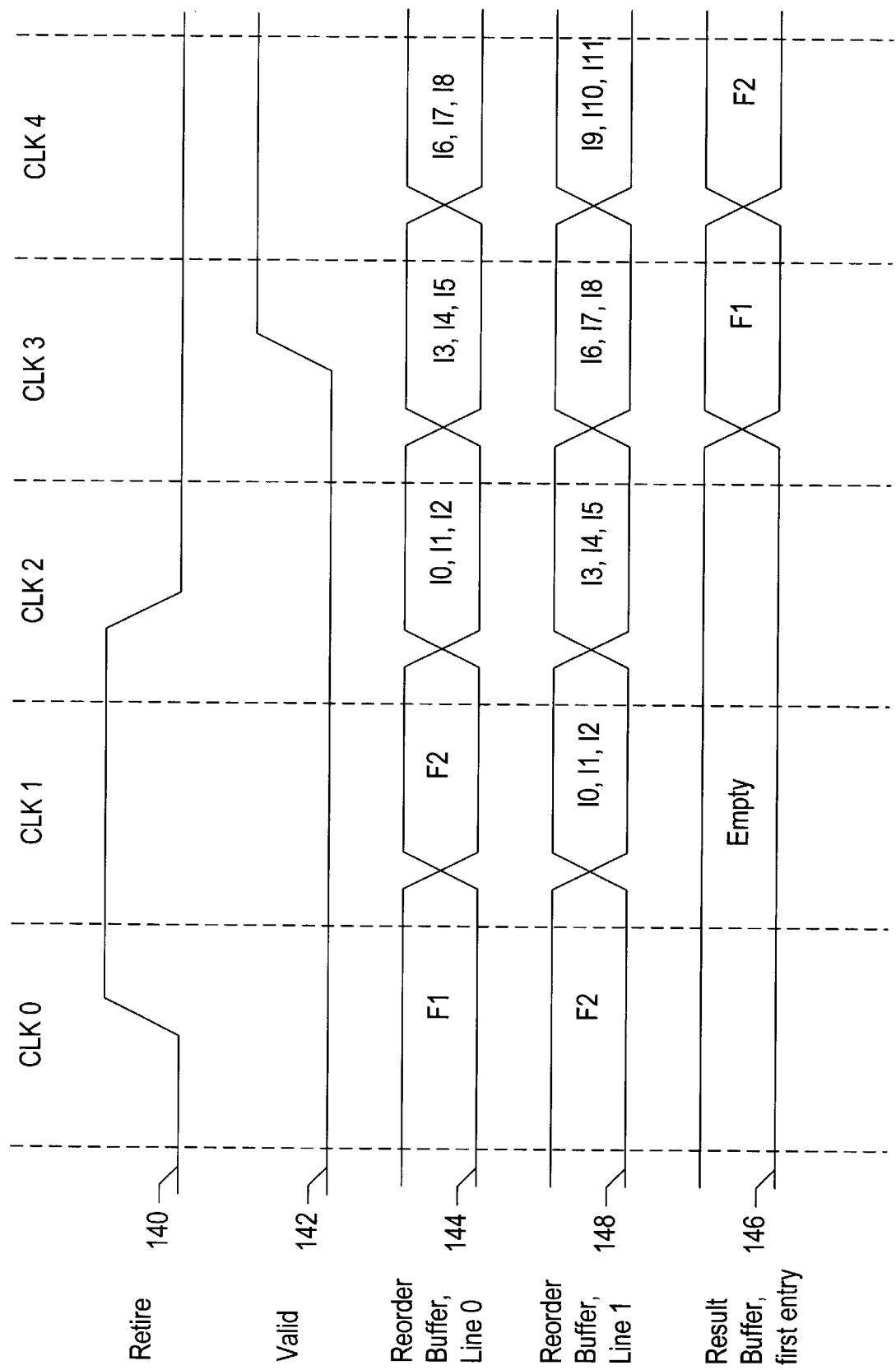
FIG. 9 is a timing diagram illustrating two assertions of the retire signal prior to corresponding assertions of the valid signal.

Turning next to FIG. 9, a timing diagram illustrating a retirement of a floating point instruction F1 and a subsequent floating point instruction F2 is shown for the case in which exceptions are masked. Clock cycles are delimited in FIG. 9 via vertical dashed lines, and each clock cycle is labeled consecutively from CLK0 to CLK4. Similar to FIG. 6, the retire signal is shown via waveform 140 and the valid signal is shown via waveform 142. Additionally, the contents of reorder buffer line 0 (i.e. the line representing the instruction or instructions which are foremost, in program order, of the instructions within reorder buffer 32) are illustrated at reference number 144. Similarly, the contents of the first entry within result buffer 96 are illustrated at reference number 146 and the contents of reorder buffer line 1 are shown at reference number 148.

In the timing diagram of FIG. 9, reorder buffer line 0 receives floating point instruction F1 and reorder buffer line 1 receives floating point instruction F2 during clock cycle CLK0. FPU interface unit 124 asserts the retire signal during clock cycle CLK0 in response to floating point instruction F1, and discards floating point instruction F1. During clock cycle CLK1, FPU interface unit 124 asserts the retire signal in response to the floating point instruction F2 and discards floating point instruction F2. Since exceptions are masked, reorder buffer 32 does not wait for the assertion of the corresponding valid signals. The valid signals are guaranteed to be asserted because an exception (by definition of the masking thereof) cannot occur. However, if a particular floating point instruction which may update the floating point state is executed, reorder buffer 32 may withhold retires for subsequent floating point instructions until the result of particular floating point instruction is known.

Since result buffer 96 is empty during clock cycles CLK0 and CLK1, FPU control unit 92 stores an indication of each assertion of the retire signal. Result buffer 96 does not receive the instruction result corresponding to instruction F1 until clock cycle CLK3 and the instruction result corresponding to instruction F2 until clock cycle CLK4. Therefore, FPU control unit 92 asserts the valid signal in clock cycle CLK3 for instruction F1 and in clock cycle CLK4 for instruction F2. Instruction F1 is thereby retired by result buffer 96 during clock cycle CLK3 and instruction F2 during clock cycle CLK4.

As an alternative to the timing diagrams of FIG. 9, the valid signal may be asserted by FPU control unit 92 upon receipt of floating point instructions F1 and F2 (and other floating point instructions) when floating point exceptions are masked. The assertions are stored into valid shift register 126 and are used by reorder buffer 32 when floating point instructions F1 and F2 are selected for retirement. The advantage of this alternative is that reorder buffer 32 need not be explicitly informed that exceptions are masked.

Instead, the natural operation of the early assertions of the valid signal and storing the assertions in shift register 126 allows reorder buffer 32 to retire the floating point instructions upon their arrival at line 0 of the reorder buffer. The design of reorder buffer 32 may thereby be simplified.

Figure 10:
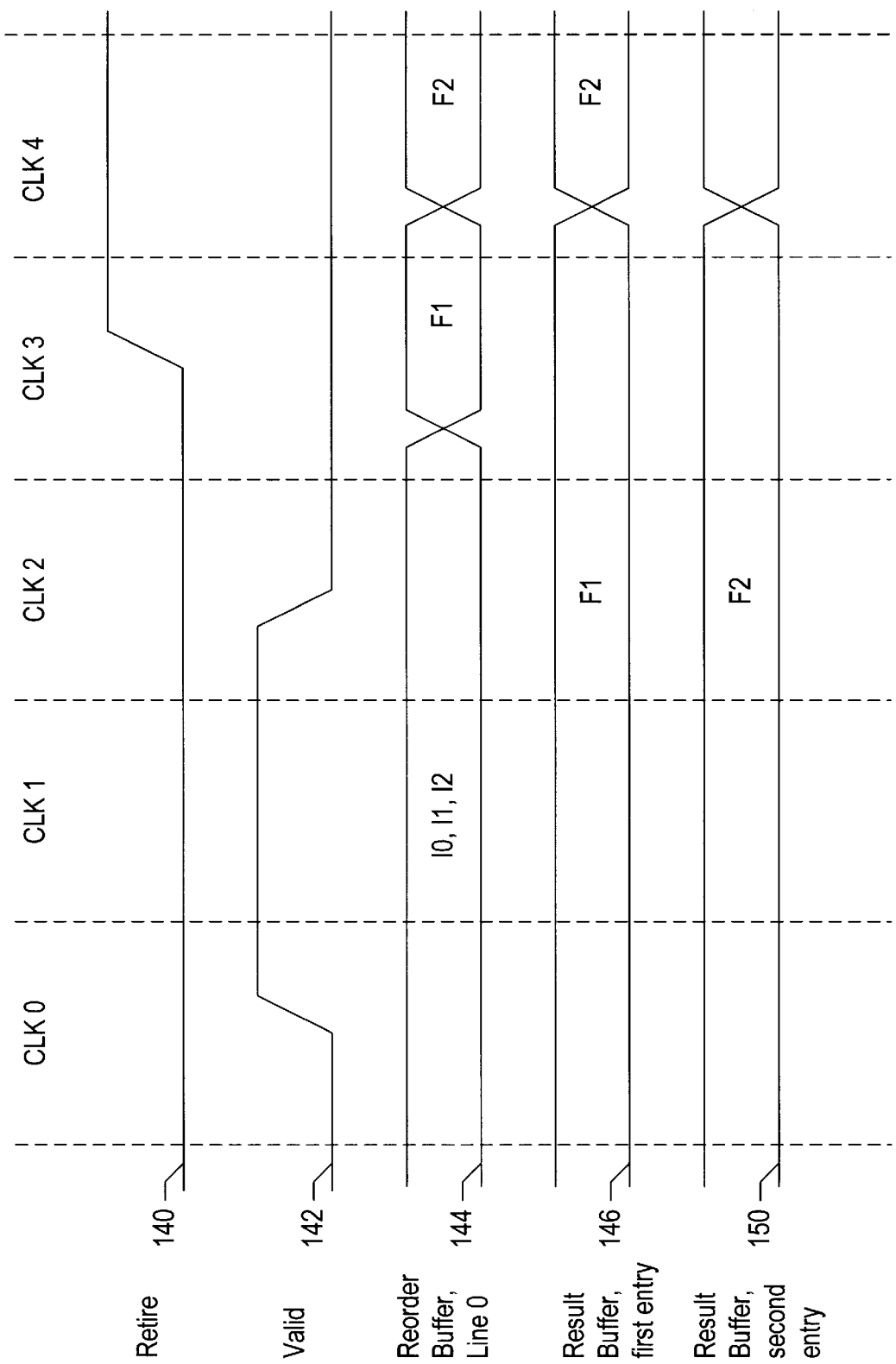
FIG. 10 is a timing diagram illustrating two assertions of the valid signal prior to corresponding assertions of the retire signal.

Turning now to FIG. 10, a timing diagram illustrating yet another example of retirement of a floating point instruction F1 and a subsequent floating point instruction F2 is shown. Clock cycles are delimited in FIG. 10 via vertical dashed lines, and each clock cycle is labeled consecutively from CLK0 to CLK4. Similar to FIG. 6, the retire signal is shown via waveform 140 and the valid signal is shown via waveform 142. Additionally, the contents of reorder buffer line 0 (i.e. the line representing the instruction or instructions which are foremost, in program order, of the instructions within reorder buffer 32) are illustrated at reference number 144. Similarly, the contents of the first entry within result buffer 96 are illustrated at reference number 146 and the contents of the second entry within result buffer 96 are shown at reference number 150.

In the example of FIG. 9, instruction results for instructions F1 and F2 are stored in the first and second entries of result buffer 96 during clock cycle CLK0. Therefore, FPU control unit 92 asserts the valid signal for instruction F1 during clock cycle CLK0 and for instruction F2 during clock cycle CLK1. Instruction F1 arrives at line 0 of reorder buffer 32 during clock cycle CLK3, in response to which FPU interface unit 124 asserts the retire signal during clock cycle CLK3. During clock cycle CLK4, FPU interface unit 124 asserts the retire signal in response to instruction F2. Instruction F1 is thereby retired during clock cycle CLK3 and instruction F2 is retired during CLK4.

Figure 11:
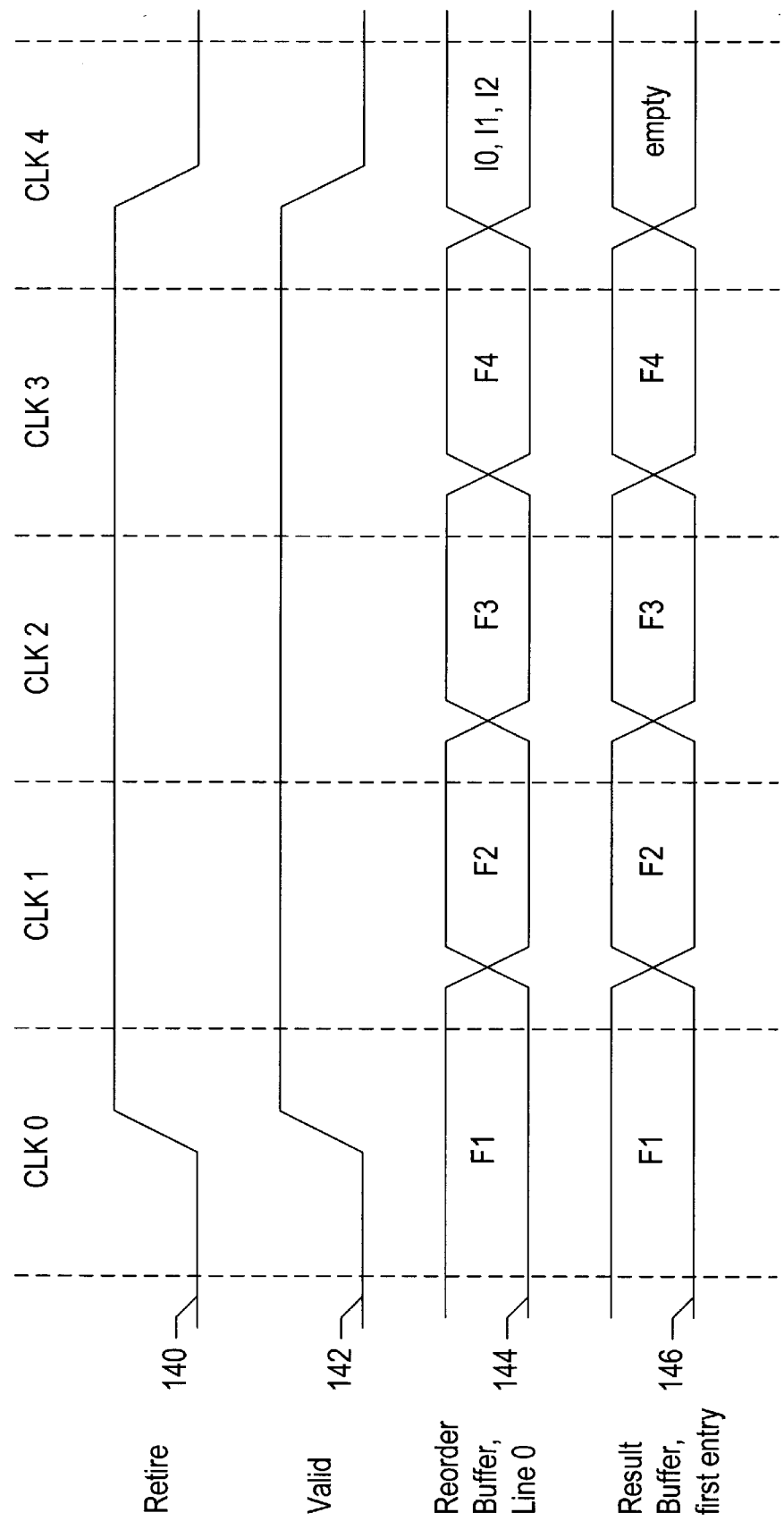
FIG. 11 is a timing diagram illustrating multiple concurrent assertions of the valid signal and the retire signal.

FIG. 11 is a timing diagram illustrating the use of the interface between reorder buffer 32 and FPU 36 to sustain a one floating point instruction per clock cycle retire rate. Similar to FIGS. 6 through 9, the retire signal is illustrate via waveform 140 and the valid signal via waveform 142. Additionally, the contents of reorder buffer line 0 (i.e. the line representing the instruction or instructions which are foremost, in program order, of the instructions within reorder buffer 32) are illustrated at reference number 144. Similarly, the contents of the first entry within result buffer 96 are illustrated at reference number 146.

The timing diagram of FIG. 11 illustrates the retirement of floating point instructions F1, F2, F3, and F4. Each instruction arrives in reorder buffer line 0 and result buffer 96 during a consecutive clock cycle, and the retire and valid signals are asserted therefor. Floating point instruction F1 is thereby retired in clock cycle CLK0. Similarly, floating point instruction F2 is retired in clock cycle CLK1; floating point instruction F3 is retired in clock cycle CLK2; etc. It is noted that the arrival of an instruction at reorder buffer line 0 and the corresponding instruction result in result buffer 96 may occur in different clock cycles and still achieve a one floating point instruction per clock cycle retire rate. For example, if the instruction result corresponding to instruction F1 arrived in result buffer 96 in clock cycle CLK1 and each subsequent result arrived in the consecutive clock cycles, then the valid signal assertions would begin in clock cycle CLK1 and instructions would be retired (at a rate of one per clock cycle) through clock cycle CLK4. It is noted that the cancel and exception signals operate in a manner similar to the retire and valid signals shown above.

Figure 12:
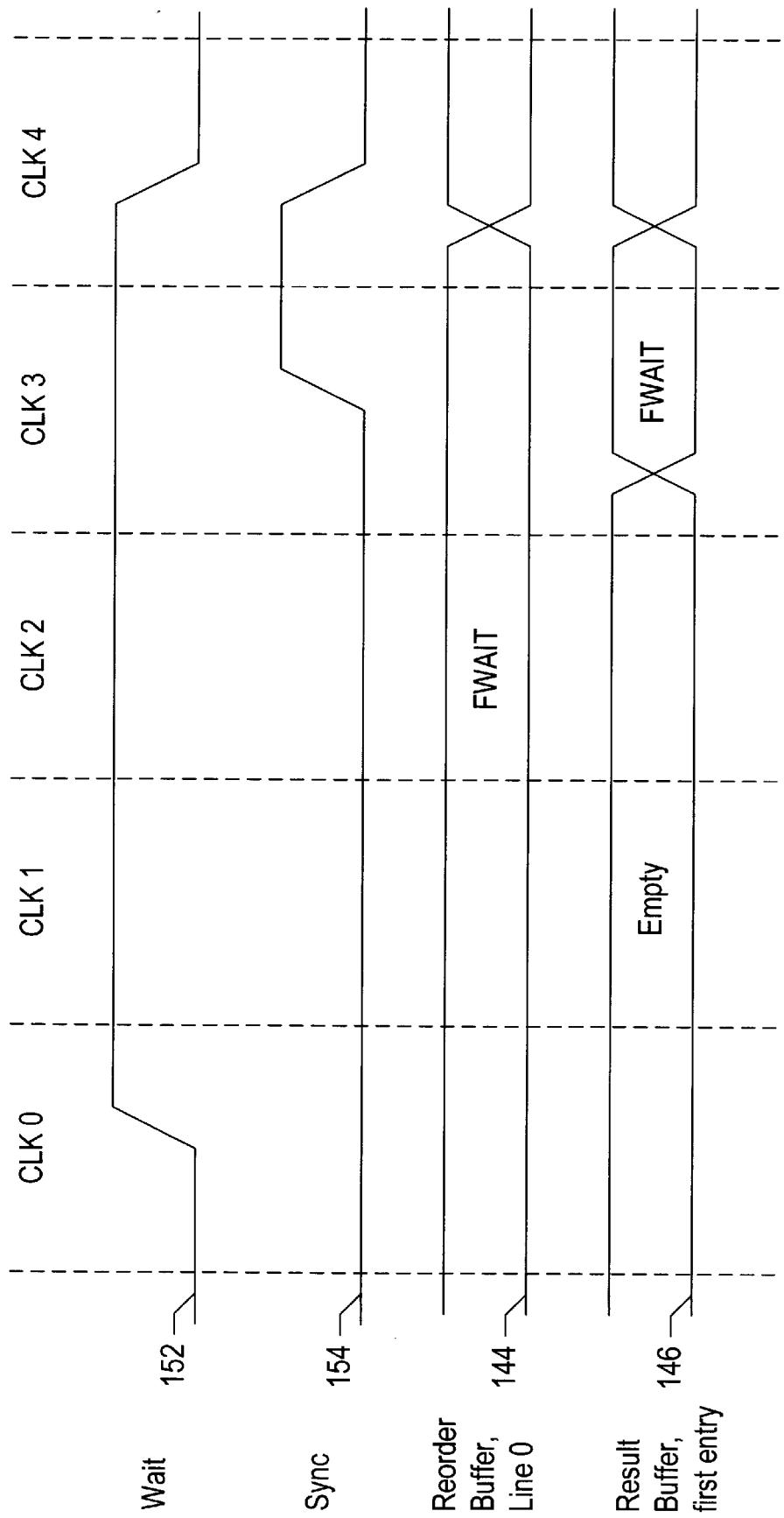
FIG. 12 is a timing diagram illustrating assertion of a wait signal prior to a corresponding assertion of a sync signal.
Figure 13:
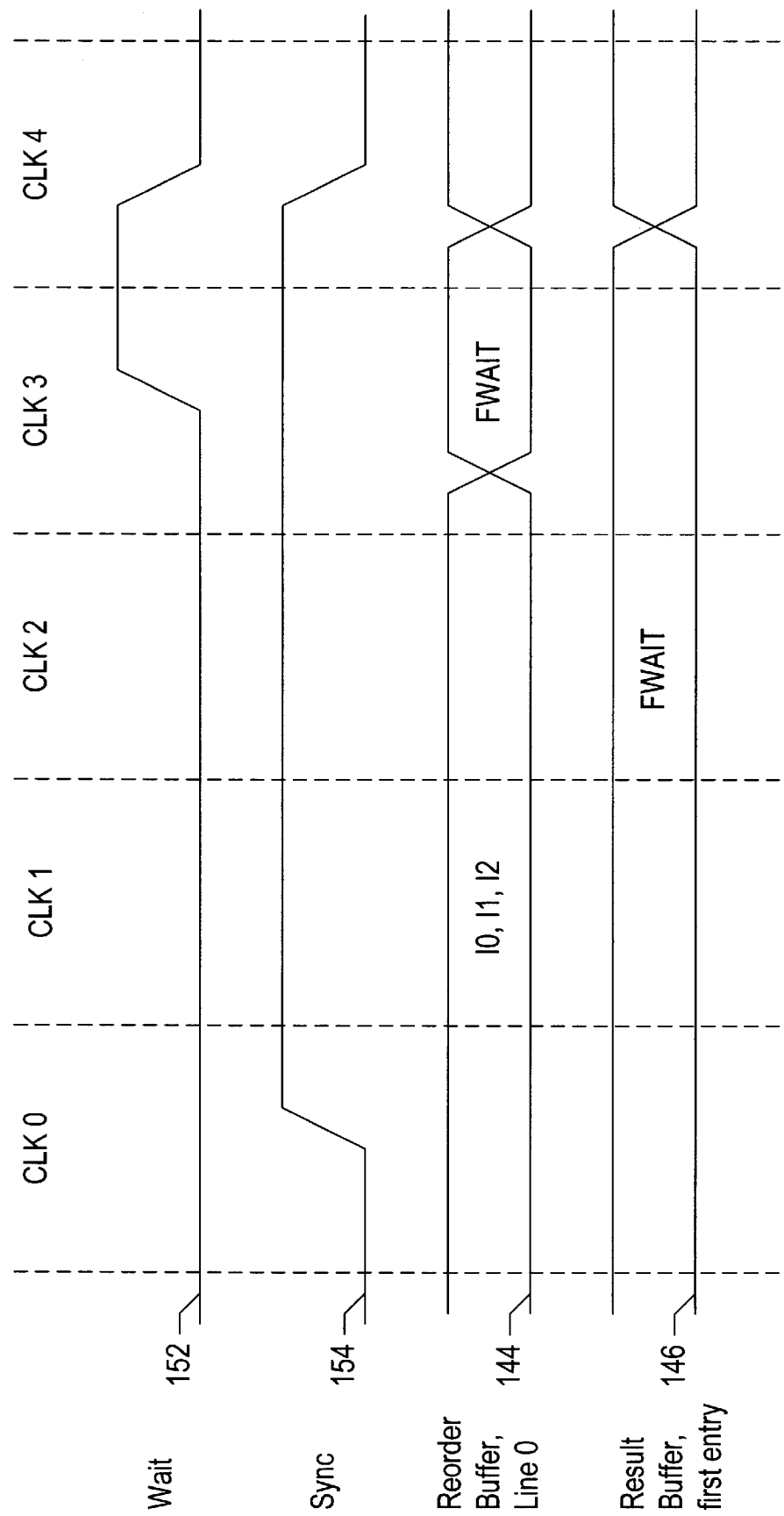
FIG. 13 is a timing diagram illustrating assertion of the sync signal prior to the corresponding assertion of the wait signal.

FIGS. 12 and 13 illustrate the operation of the wait and sync signals (illustrated at reference numbers 152 and 154, respectively) for retiring a floating point synchronization instruction. Additionally, the contents of reorder buffer line 0 are shown at reference number 144 and the contents of the first entry of result buffer 96 are shown at reference number 146.

As opposed to the retire, cancel, valid, and exception signals, which are pulsed to indicate the state of a given floating point instruction, the wait and sync signals are held asserted until a corresponding assertion of the other signal is detected. For example, in FIG. 12 the wait signal is asserted upon arrival of the FWAIT instruction (a floating point synchronization instruction) into reorder buffer line 0. The wait signal remains asserted until a corresponding assertion of the sync signal in clock cycle CLK3. The sync signal is asserted in clock cycle CLK3 in response to the arrival of the FWAIT instruction into result buffer 96.

Similarly, in FIG. 13 the sync signal is asserted upon arrival of the FWAIT instruction into result buffer 96. The sync signal remains asserted until the corresponding assertion of the wait signal in clock cycle CLK3. The wait signal is asserted in clock cycle CLK3 in response to the arrival of the FWAIT instruction into reorder buffer line 0.

When either the sync or the wait signal is asserted, assertions of the retire, cancel, valid, and exception signals are withheld except for instructions which are prior to the FWAIT instruction in program order. In this manner, reorder buffer 32 and FPU 36 become synchronized.

Figure 14:
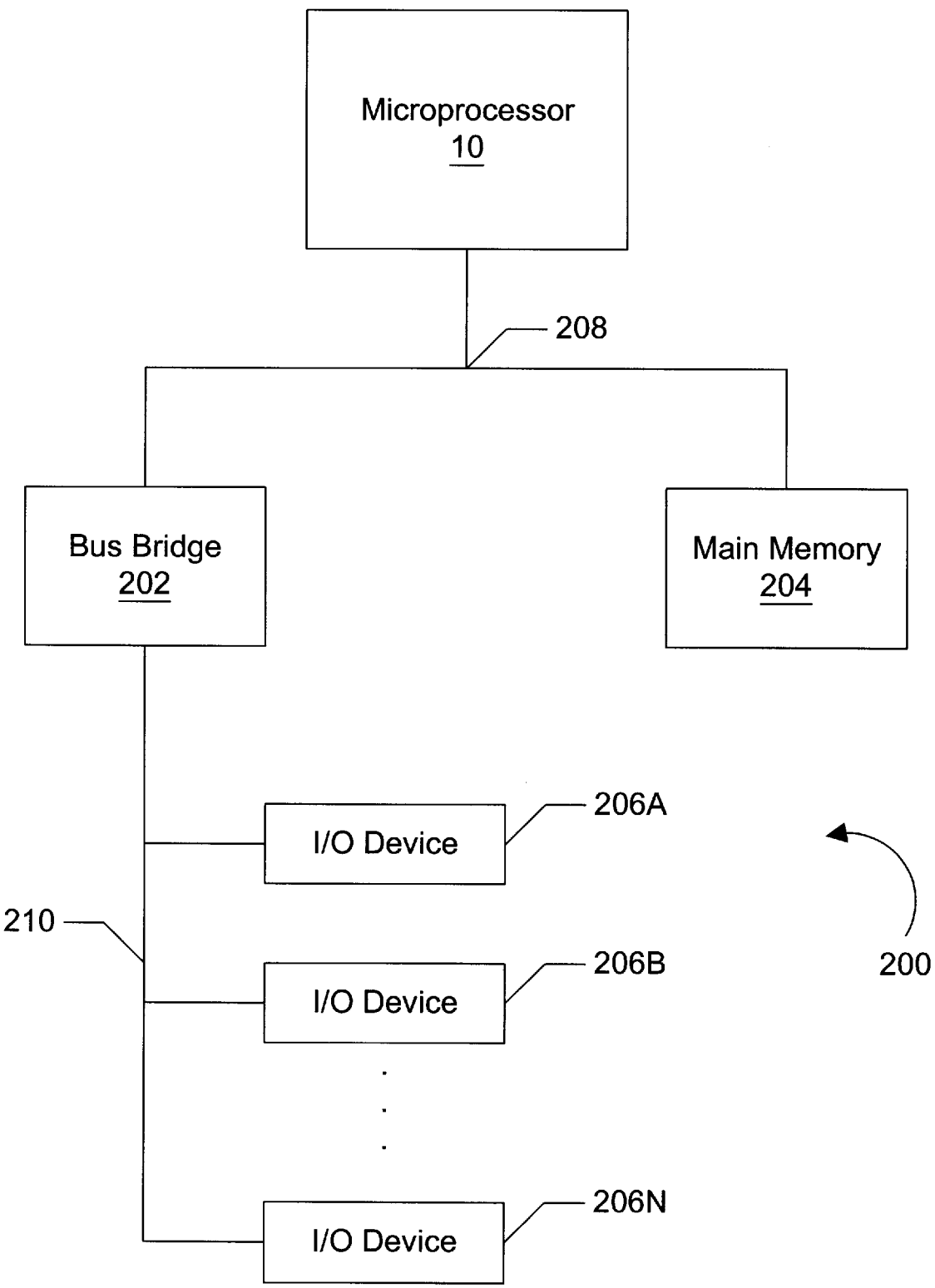
FIG. 14 is a block diagram of one embodiment of a computer system including the microprocessor shown in FIG. 1.

Turning now to FIG. 14, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 14 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| x86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |

TABLE 1-continued x86 Fast Path, Double Dispatch, and MROM Instructions

| x86 Instruction | Instruction Category |
| --- | --- |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPE | MROM |
| POPFD | MROM |
| PUSH | fast path/double dispatch |
| PUSHA | MROM |
| PUSHAD | MROM |
| PUSHF | fast path |
| PUSHFD | fast path |

TABLE 1-continued x86 Fast Path, Double Dispatch, and MROM Instructions

| x86 Instruction | Instruction Category |
|---|---|
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions. Furthermore, floating point instructions are considered to be MROM instructions.

In accordance with the above disclosure, an interface for loosely coupling an FPU to an integer machine in a microprocessor is shown. Due to the loose coupling nature of the interface, either the FPU or the integer machine may indicate one or more instructions for retirement, advantageously allowing either unit to get "ahead" of the other. The independence of the floating point unit is thereby maintained while still allowing the units to be integrated.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a reorder buffer configured to store instruction results corresponding to a plurality of instructions, wherein said reorder buffer is further configured to store a plurality of floating point indications, and wherein each one of said plurality of floating point indications is indicative, in a first state, that a corresponding one of said plurality of instructions is a floating point instruction, and wherein said reorder buffer is configured to assert a retire signal upon selecting a first floating point instruction for retirement; and
   a floating point unit coupled to said reorder buffer, wherein said floating point unit is configured to execute floating point instructions, and wherein said floating point unit is further configured to assert a valid signal upon generating a floating point result corresponding to said first floating point instruction;
   wherein said floating point unit is coupled to receive said retire signal and said reorder buffer is coupled to receive said valid signal, and wherein said floating point unit is configured to retire said first floating point instruction once both said retire signal and said valid signal have been asserted, and wherein said reorder buffer is configured to retire said first floating point instruction upon asserting said retire signal, and wherein said floating point unit is configured to assert said valid signal for said first floating point instruction even if said retire signal has yet to be asserted for said first floating point instruction, and wherein said reorder buffer is configured to assert said retire signal for said first floating point instruction even if said valid signal has yet to be asserted for said first floating point instruction.

2. The microprocessor as recited in claim 1 wherein said reorder buffer is configured to pulse said retire signal for one clock cycle with regard to said first floating point instruction, and wherein a subsequent assertion of said retire signal corresponds to a different floating point instruction.

3. The microprocessor as recited in claim 2 wherein said floating point unit is configured to capture said pulse of said retire signal and store an indication of said pulse until said floating point result is generated.

4. The microprocessor as recited in claim 3 wherein said floating point unit comprises a shift register within which said indication is stored, and wherein said shift register is further configured to store multiple indications of pulses of said retire signal corresponding to multiple different floating point instructions.

5. The microprocessor as recited in claim 2 wherein said floating point unit is configured to pulse said valid signal for one clock cycle with regard to said first floating point instruction, and wherein a subsequent assertion of said valid signal corresponds to said different floating point instruction.

6. The microprocessor as recited in claim 5 wherein aid reorder buffer is configured to capture said pulse of said valid signal and to store an indication of said pulse until said first floating point instruction is selected for retirement.

7. The microprocessor as recited in claim 6 wherein said reorder buffer comprises a shift register within which said indication is stored, and wherein said shift register is further configured to store multiple indications of pulses of said valid signal corresponding to multiple different floating point instructions.

8. The microprocessor as recited in claim 1 wherein said floating point unit comprises a result queue configured to store said floating point result.

9. The microprocessor as recited in claim 1 wherein said reorder buffer is configured to assert a cancel signal instead of said retire signal if said first floating point instruction is canceled.

10. The microprocessor as recited in claim 9 wherein said floating point unit is coupled to receive said cancel signal and is configured to discard said first floating point instruction upon receipt of an assertion of said cancel signal.

11. The microprocessor as recited in claim 1 wherein said floating point unit is configured to assert an exception signal instead of said valid signal if said floating point unit detects an exception with regard to said first floating point instruction.

12. The microprocessor as recited in claim 11 wherein said reorder buffer is coupled to receive said exception signal and is configured to discard said plurality of instructions upon receipt of an assertion of said exception signal.

13. A method for performing a floating point instruction in a microprocessor comprising:

storing an indication of said floating point instruction in a reorder buffer within said microprocessor;

dispatching said floating point instruction to a floating point unit within said microprocessor;

asserting a retire signal from said reorder buffer to said floating point unit upon selecting said floating point instruction for retirement;

asserting a valid signal from said floating point unit to said reorder buffer upon generating a floating point result corresponding to said floating point instruction within said floating point unit;

storing said floating point result into a register within said floating point unit once both said valid signal and said retire signal have been asserted; and discarding said floating point instruction from said reorder buffer once said retire signal has been asserted.

14. The method as recited in claim 13 wherein said asserting said retire signal comprises pulsing said retire signal for one clock cycle.

15. The method as recited in claim 13 wherein said asserting said valid signal comprises pulsing said valid signal for one clock cycle.

16. The method as recited in claim 13 wherein said asserting said retire signal is performed even if said asserting said valid signal has yet to be performed.

17. The method as recited in claim 16 wherein said asserting said valid signal is performed even if said asserting said retire signal has yet to be performed.

18. The method as recited in claim 13 further comprising asserting said valid signal for a second floating point instruction subsequent to said asserting said valid signal but prior to said asserting said retire signal.

19. The method as recited in claim 13 further comprising asserting said retire signal for a second floating point instruction subsequent to said asserting said retire signal but prior to said asserting said valid signal.

20. A microprocessor comprising:

a reorder buffer configured to store instruction results corresponding to a plurality of instructions, wherein said reorder buffer is further configured to store a plurality of floating point indications, and wherein each one of said plurality of floating point indications is indicative, in a first state, that a corresponding one of said plurality of instructions is a floating point instruction;

a floating point unit coupled to said reorder buffer, wherein said floating point unit is configured to execute floating point instructions, and wherein said floating point unit is further configured to generate a floating point result corresponding to said first floating point instruction;

a first conductor coupled between said reorder buffer and said floating point unit, wherein said reorder buffer is configured to assert a retire signal upon said first conductor upon selecting said first floating point instruction for retirement;

a second conductor coupled between said reorder buffer and said floating point unit, wherein said floating point unit is configured to assert a valid signal upon said second conductor upon generating said floating point result if said first floating point instruction does not experience an exception;

a third conductor coupled between said reorder buffer and said floating point unit, wherein said floating point unit is configured to assert an exception signal upon said third conductor upon generating said floating point result if said first floating point instruction does experience said exception;

a fourth conductor coupled between said reorder buffer and said floating point unit, wherein said reorder buffer is configured to assert a cancel signal upon said fourth conductor upon selecting said first floating point instruction for retirement and said first floating point instruction is canceled;

a fifth conductor coupled between said reorder buffer and said floating point unit, wherein said reorder buffer is configured to assert a wait signal upon said fifth conductor upon selecting a floating point synchronization instruction for retirement; and a sixth conductor coupled between said reorder buffer and said floating point unit, wherein said floating point unit is configured to assert a sync signal upon said sixth conductor upon executing said floating point synchronization instruction;

wherein said floating point unit is configured to retire said first floating point instruction once both said retire signal and said valid signal have been asserted, and wherein said reorder buffer is configured to retire said first floating point instruction upon asserting said retire signal, and wherein said floating point unit is configured to assert said valid signal for said first floating point instruction even if said retire signal has yet to be asserted for said first floating point instruction, and wherein said reorder buffer is configured to assert said retire signal for said first floating point instruction even if said valid signal has yet to be asserted for said first floating point instruction.

* * * * *